United States Patent
Zasoba et al.

(10) Patent No.: US 12,440,076 B2
(45) Date of Patent: Oct. 14, 2025

(54) BATHROOM CLEANING ROBOT

(71) Applicant: Somatic Holdings, Inc., Lawrence, NY (US)

(72) Inventors: Ievgenii Zasoba, Lviv (UA); Michael Levy, New York, NY (US); Illia Pavliuk, Lviv (UA); Myroslav Borkovski, Lviv (UA); Roman Adler, Lviv (UA); Olga Avramidi, Lviv (UA)

(73) Assignee: Somatic Holdings, Inc., Lawrence, NY (US)

( * ) Notice: Subject to any disclaimer, the term of this patent is extended or adjusted under 35 U.S.C. 154(b) by 0 days.

(21) Appl. No.: 18/231,476

(22) Filed: Aug. 8, 2023

(65) Prior Publication Data

US 2025/0049274 A1 Feb. 13, 2025

(51) Int. Cl.
*A47L 7/00* (2006.01)
*A47L 9/00* (2006.01)
(Continued)

(52) U.S. Cl.
CPC ........... *A47L 7/0019* (2013.01); *A47L 7/0023* (2013.01); *A47L 9/009* (2013.01); *A47L 9/2805* (2013.01); *A47L 9/2842* (2013.01); *A47L 9/2847* (2013.01); *A47L 9/2852* (2013.01); *A47L 9/2884* (2013.01); *A47L 11/4005* (2013.01);
(Continued)

(58) Field of Classification Search
None
See application file for complete search history.

(56) References Cited

U.S. PATENT DOCUMENTS 11,019,966 B2 * 6/2021 Ashbaugh ............. A47L 11/408
11,199,853 B1 * 12/2021 Afrouzi .................. B25J 13/006
(Continued)

FOREIGN PATENT DOCUMENTS

CN 217703407 U 11/2022
EP 2910695 A1 8/2015

OTHER PUBLICATIONS

International Search Report and Written Opinion of the International Search Authority in international application No. PCT/US2024/041535, mailed on Feb. 10, 2025.
(Continued)

*Primary Examiner* — Rita P Adhlakha
(74) *Attorney, Agent, or Firm* — Cognition IP, P.C.; Edward Steakley; Justin White

(57) ABSTRACT

A bathroom cleaning robot can include a main body, a mobility module, a robotic arm, different cleaning tools, a tool change module, and a door opening module. The main body can have an outer housing containing internal components that facilitate autonomous bathroom cleaning. The mobility module can move the bathroom cleaning robot autonomously across floors. The robotic arm can have a fixed end, a movable end, and multiple movable arm segments therebetween. Each cleaning tool can be mounted along an outer robot surface and can be removed and manipulated by the robotic arm to perform a cleaning function. The tool change module can facilitate securely coupling and uncoupling the robotic arm to each different cleaning tool. The door opening module can pull and hold open a spring-loaded door while the mobility module moves the bathroom cleaning robot through the open door.

20 Claims, 28 Drawing Sheets

(51) Int. Cl.
*A47L 9/28* (2006.01)
*A47L 11/40* (2006.01)
*B25J 15/04* (2006.01)

(52) U.S. Cl.
CPC ....... *A47L 11/4011* (2013.01); *A47L 11/4016* (2013.01); *A47L 11/4036* (2013.01); *A47L 11/4066* (2013.01); *A47L 11/4072* (2013.01); *A47L 11/4083* (2013.01); *A47L 11/4088* (2013.01); *B25J 15/0466* (2013.01); *A47L 2201/04* (2013.01); *A47L 2201/06* (2013.01)

(56) References Cited

U.S. PATENT DOCUMENTS

| | | |
|---|---|---|
| 11,407,118 B1 | 8/2022 | Augenbraun et al. |
| 2006/0156499 A1 | 7/2006 | DeRoma |
| 2010/0106298 A1 | 4/2010 | Hernandez et al. |
| 2019/0054634 A1* | 2/2019 | Haddadin ............ F16M 11/041 |
| 2019/0246858 A1 | 8/2019 | Karasikov et al. |
| 2021/0237554 A1 | 8/2021 | Bangalore Srinivas et al. |
| 2022/0031895 A1 | 2/2022 | Le Polotec et al. |
| 2022/0388180 A1 | 12/2022 | Ma et al. |

OTHER PUBLICATIONS

SOMATIC—bathroom cleaning robots for office buildings (getSOMATIC), Aug. 19, 2019, online, retrieved from [URL: https://www.youtube.com/watch?v=CLKC4gYsDLA].

* cited by examiner

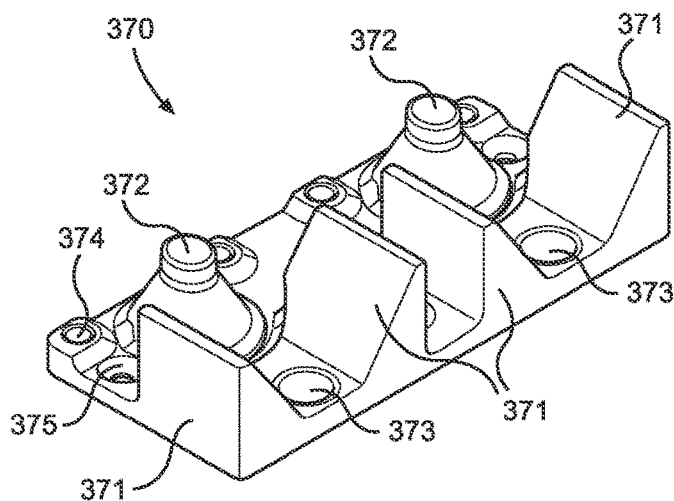
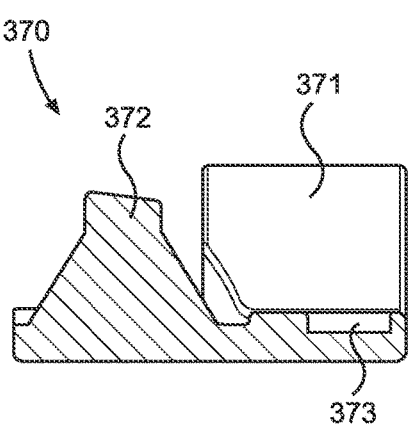
FIG. 9A
FIG. 9B
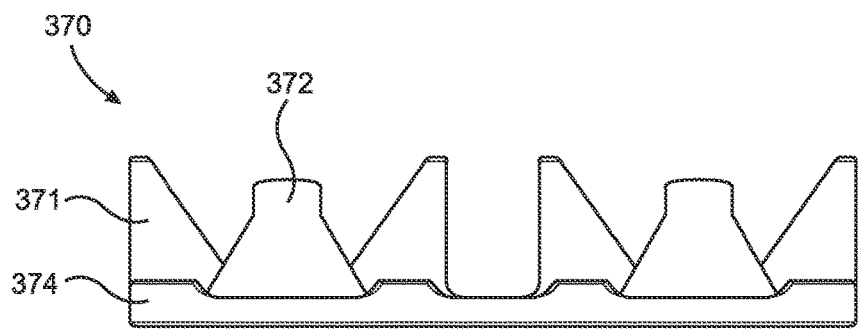
FIG. 9C
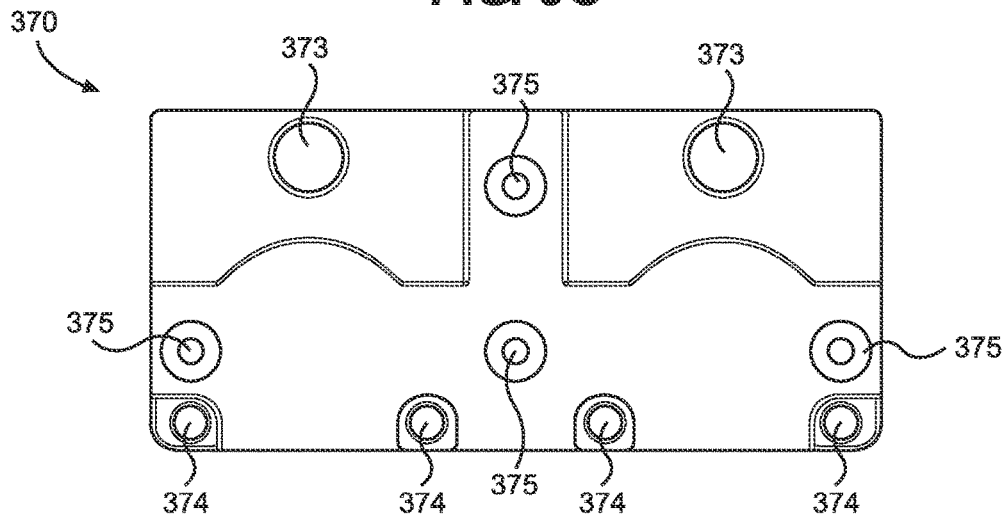
FIG. 9D

BATHROOM CLEANING ROBOT

TECHNICAL FIELD

The present disclosure relates generally to cleaning devices, and more particularly to autonomous robotic cleaning devices.

BACKGROUND

Robots that clean various items or areas have existed for decades, and many are able to perform cleaning tasks without constant human intervention or guidance. For example, early vacuuming robots could autonomously traverse indoor areas and vacuum floors while avoiding furniture and other objects. As the fields of robotics and consumer products have expanded, more advanced forms of cleaning robots have included those that can pick up garbage, wash floors, clean toilets, sinks, and other fixtures, patrol areas, and conduct other domestic and commercial tasks that have traditionally been manually performed. Such cleaning robots can save substantial costs and manual labor hours that have been required for cleaning endeavors.

Unfortunately, many types of cleaning robots are specialized to perform specific tasks such that multiple robots may be required, most or all of which still require some form of human intervention or guidance. For example, even mobile cleaning robots that traverse floors can still require a human to perform functions that the robots just cannot do themselves, such as transport the robots, hold open spring-loaded doors, change cleaning tools, and other complex tasks.

Although traditional cleaning robots have worked well in the past, improvements are always helpful. In particular, what is desired are cleaning robots that can hold open and enter through spring-loaded doors, change cleaning tools, and perform other tasks and functions in order to clean bathrooms and other indoor regions without human supervision or intervention.

SUMMARY

It is an advantage of the present disclosure to provide autonomous cleaning robots that can clean indoor regions such as bathrooms by performing numerous functions without any human supervision, intervention, or guidance. The disclosed features, apparatuses, systems, and methods relate to autonomous cleaning robots that are able to perform many cleaning tasks and other complex functions autonomously, such as to navigate indoor environments, hold open and enter through spring-loaded doors, and change between many different cleaning tools.

In various embodiments of the present disclosure, a bathroom cleaning robot can include a main body, a mobility module, a robotic arm, a plurality of different cleaning tools, a tool change module, and a door opening module. The main body can have a main outer housing containing a plurality of internal components configured to facilitate the autonomous cleaning of a bathroom. The mobility module can be coupled to the main body and can be configured to move the bathroom cleaning robot autonomously across a floor within the bathroom. The robotic arm can have a fixed end coupled to the main body or the mobility module, a movable end configured to move through multiple degrees of freedom relative to the fixed end, and multiple movable arm segments between the fixed end and the movable end, wherein the robotic arm is configured to facilitate the autonomous cleaning of the bathroom. The plurality of different cleaning tools can be removably mounted to respective mounting locations along one or more outer surfaces of the main body, the mobility module, or both, wherein each of the plurality of different cleaning tools can be configured to be removed from its respective mounting location and to be manipulated by the robotic arm to perform a cleaning function within the bathroom. The tool change module can be configured to facilitate securely coupling and uncoupling the robotic arm to each of the plurality of different cleaning tools. The door opening module can be configured to pull open and hold open a spring-loaded door autonomously while the mobility module moves the robotic cleaning device autonomously through the open spring-loaded door between a region outside of the bathroom and the bathroom.

In various detailed embodiments, the plurality of internal components within the main body can include a fresh water tank configured to hold fresh water, a fresh water pump configured to pump water from the fresh water tank, at least one chemical tank configured to hold one or more cleaning chemicals, a mixer configured to mix the one or more cleaning chemicals with fresh water, a dirty water tank configured to hold dirty water, a vacuum configured to suck dirty water into the dirty water tank, a blower configured to generate an external airflow, and an electronics region including one or more processing components configured to control autonomous functions of the bathroom cleaning robot. The bathroom cleaning robot can also include a plurality of ports located along one or more outer surfaces of the main body, the mobility module, or both. Ports can include a dirty water intake port, an electrical port, a cleaning fluid intake port, a clean water intake port, a dirty water discharge port, a vacuum port, and a blower port, among other possible ports.

In further detailed embodiments, the mobility module can include a plurality of wheels, a separate motor for each wheel and configured to drive its respective wheel forward and backward independently, a suspension, one or more batteries configured to power each of the separate motors, and one or more sensors configured to detect the location of the mobility module with respect to separate items within the bathroom. At least one of the plurality of different cleaning tools can include a cleaning end effector, a first rigid segment, a second rigid segment, and a flexible coupling component between the first rigid segment and second rigid segment. The plurality of different cleaning tools can include a vacuum tool, a squeegee tool, a gripping tool, a spraying tool, a blowing tool, and a hooking tool, among other possible cleaning tools. In some arrangements, the bathroom cleaning robot can also include a floor vacuum module coupled to the mobility module and configured to vacuum autonomously a floor within the bathroom.

In still further detailed embodiments, the tool change module can include a robotic arm coupler on the movable end of the robotic arm and a separate tool coupler on each of the plurality of different cleaning tools. Each separate tool coupler can be configured to removably couple with the robotic arm coupler. In some arrangements, a camera can be coupled to the robotic arm proximate the robotic arm coupler. The camera can be configured to confirm a location of the robotic arm coupler and to confirm a proper coupling of the robotic arm coupler to a separate tool coupler on one of the plurality of different cleaning tools. The robotic arm can be configured to move its movable end through multiple degrees of freedom to facilitate removably coupling the robotic arm coupler to the tool coupler on each of the plurality of different cleaning tools while each of the plurality of different cleaning tools is mounted at its respective mounting location, to unmount and remove each of the plurality of different cleaning tools from its respective mounting location while removably coupled to the robotic arm coupler, to manipulate each of the plurality of different cleaning tools to perform a cleaning function within the bathroom, to remount each of the plurality of different cleaning tools to its respective mounting location, and to uncouple the robotic arm coupler from the tool coupler on each of the plurality of different cleaning tools while the respective cleaning tool is remounted to its respective mounting location. The robotic arm coupler can include a conically shaped extending portion and each separate tool coupler can include an internally conically shaped receiving portion configured to mate with the extending portion, the extending portion including a spring-loaded locking component that protrudes through an opening in each of the receiving portions. The tool change module can further include a mounting component at each mounting location, and each mounting component can be configured to removably mount one or more of the plurality of different cleaning tools thereto.

In additional detailed embodiments, the door opening module can include an extendable foot arrangement configured to automatically extend from the bathroom cleaning robot, pivot behind the spring-loaded door while the spring-loaded door is open, contact a surface of the spring-loaded door on the other side the bathroom cleaning robot, and hold open the spring-loaded door while the mobility module moves the robot autonomously through the open spring-loaded door. In some arrangements, the extendable foot arrangement can be located within the mobility module and the robotic arm can be configured to actuate a door lever or doorknob of the spring-loaded door and pull open the spring-loaded door.

In various further embodiments of the present disclosure, a robot configured to clean an indoor region autonomously can include at least a main body, a mobility module, a robotic arm, one or more cleaning tools, and a door opening module. The main body can have a main outer housing containing a plurality of internal components configured to facilitate autonomous cleaning within an indoor region. The mobility module can be coupled to the main body and configured to move the robot autonomously across a floor within the indoor region. The robotic arm can have a fixed end and a movable end configured to move through multiple degrees of freedom relative to the fixed end, and the robotic arm can be configured to facilitate autonomous cleaning within the indoor region. The one or more cleaning tools can be configured to be manipulated by the robotic arm to perform a cleaning function within the indoor region. The door opening module can be configured to pull open a closed spring-loaded door and hold open the spring-loaded door autonomously while the mobility module moves the robotic cleaning device autonomously through the open spring-loaded door.

In various detailed embodiments, the door opening module can include the robotic arm and an extendable foot arrangement, the robot arm being configured to actuate a door lever or doorknob of the spring-loaded door and pull open the spring-loaded door and the extendable foot arrangement being configured to automatically extend from the robot, pivot behind the spring-loaded door while the spring-loaded door is open, contact a surface of the spring-loaded door on the other side of the robot, and hold open the spring-loaded door while the mobility module moves the robot through the open spring-loaded door from a region outside of the indoor region to be cleaned into the indoor region. The one or more cleaning tools can include multiple different cleaning tools removably mounted to respective mounting locations along one or more outer surfaces of the main body, the mobility module, or both. Each of the multiple different cleaning tools can be configured to be removed from its respective mounting location and to be manipulated by the robotic arm to perform a cleaning function within the indoor region. In some arrangements, the robot can also include a tool change module configured to facilitate securely coupling and uncoupling the robotic arm to each of the multiple different cleaning tools, the tool change module including a robotic arm coupler on the movable end of the robotic arm and a separate tool coupler on each of the multiple different cleaning tools. Each separate tool coupler can be configured to removably couple with the robotic arm coupler.

In still further embodiments of the present disclosure, various methods of cleaning an indoor region using an autonomously functioning cleaning robot are provided. Pertinent process steps can include performing a first cleaning function using a first cleaning tool removably coupled to a robotic arm on the cleaning robot, placing the first cleaning tool onto a first docking location, uncoupling the first cleaning tool from the robotic arm, coupling the robotic arm to a second cleaning tool at a second docking location, removing the second cleaning tool from the second docking location, and performing a second cleaning function using the second cleaning tool. All steps can be performed automatically by the cleaning robot. The first and second docking locations can be located on the cleaning robot. The second cleaning function can be different than the first cleaning function. The coupling and uncoupling of the first and second cleaning tools can utilize a tool change module configured to facilitate separately coupling and uncoupling the robotic arm to the first and second cleaning tools.

In various detailed embodiments, the tool change module can include a robotic arm coupler on the robotic arm and a separate tool coupler on each of the first and second cleaning tools configured to removably couple with the robotic arm coupler. In some arrangements, the indoor region can be a bathroom and the cleaning robot can be a bathroom cleaning robot. Additional process steps can include moving the bathroom cleaning robot across a floor of an indoor region outside of the bathroom using a mobility module of the bathroom cleaning robot, opening a closed spring-loaded hinged door using a door opening module of the bathroom cleaning robot, holding open the spring-loaded hinged door using the door opening module, and moving the bathroom cleaning robot through the open door using the mobility module while the door opening module holds open the door. All steps can be performed automatically by the bathroom cleaning robot.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures, arrangements, and methods of use for autonomous cleaning devices and robots, such as bathroom cleaning robots. These drawings in no way limit any changes in form and detail that may be made to the disclosure by one skilled in the art without departing from the spirit and scope of the disclosure.

FIG. 9A illustrates in front perspective view an example mounting component of a tool change module according to one embodiment of the present disclosure.

FIG. 9B illustrates in side cross-section view the mounting component of FIG. 9A according to one embodiment of the present disclosure.

FIG. 9C illustrates in rear elevation view the mounting component of FIG. 9A according to one embodiment of the present disclosure.

FIG. 9D illustrates in bottom plan view the mounting component of FIG. 9A according to one embodiment of the present disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods of use for autonomous cleaning robots that can clean indoor and other regions by performing numerous functions without any human supervision, intervention, or guidance. The disclosed embodiments include bathroom cleaning robots that are able to perform many cleaning tasks and other complex functions autonomously, such as to navigate indoor environments, hold open and enter through spring-loaded doors, and change between many different cleaning tools, among other tasks and functions. The disclosed bathroom cleaning robots can include a main body, a mobility module, a robotic arm, a plurality of different cleaning tools, a tool change module, and a door opening module, among other items.

Although various detailed embodiments disclosed herein discuss bathroom cleaning robots specifically, it will be readily appreciated that the disclosed features, apparatuses, modules, systems, robots, and methods can similarly be used in other environments besides bathrooms and can also be used with other suitable autonomously functioning cleaning robots as well as other autonomous robots that take advantage of the disclosed features. For example, various embodiments, modules, functions, and details disclosed herein can be used with other autonomously functioning robots that are configured to change tools on themselves and that can also pull open, hold open, and move themselves through hinged spring-loaded doors, among other automatically performed tasks and functions. Other applications, arrangements, and extrapolations beyond the illustrated embodiments are also contemplated.

Overview

Figure 1:
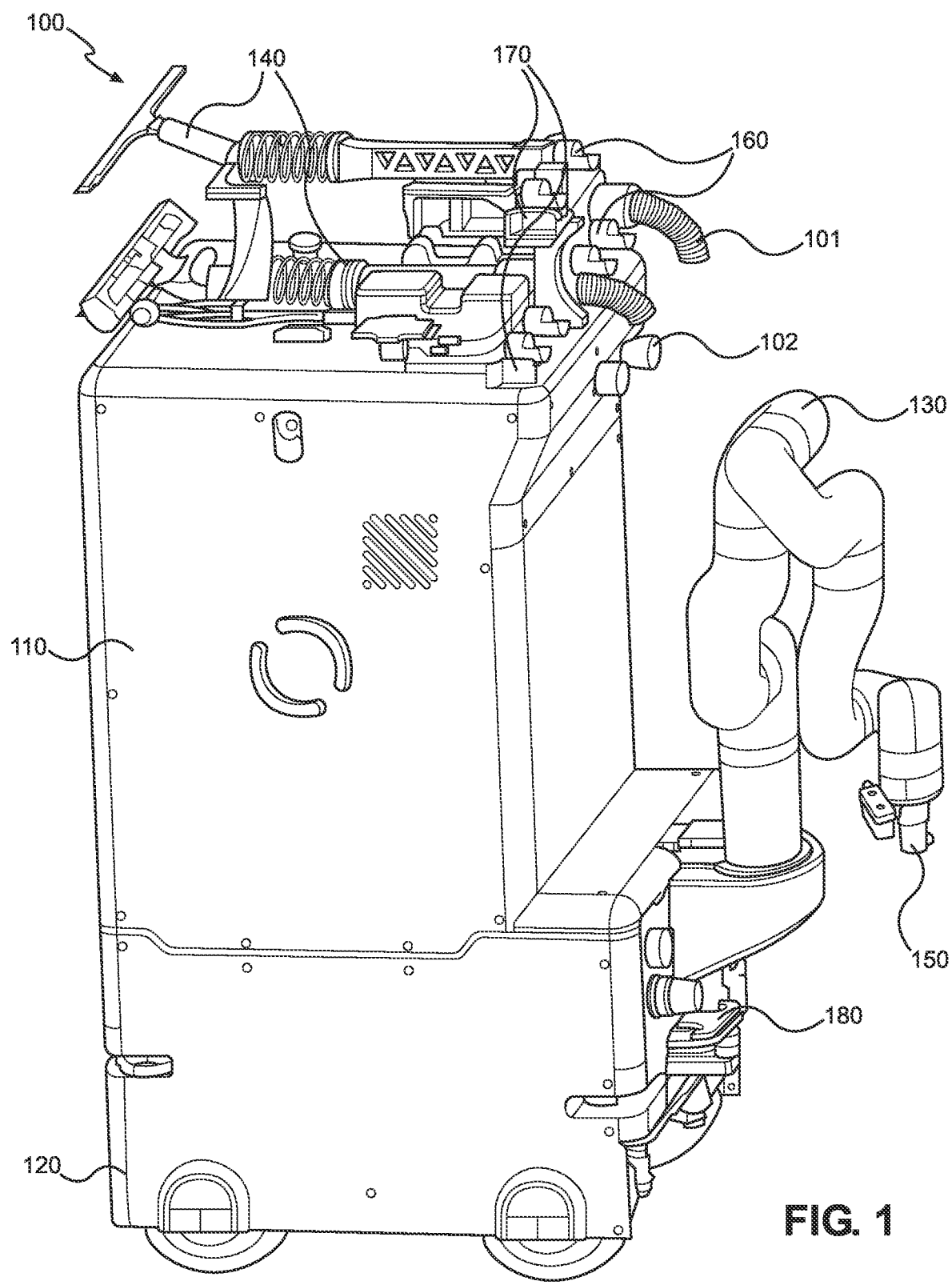
FIG. 1 illustrates in side perspective view an example cleaning robot according to one embodiment of the present disclosure.

Referring first to FIG. 1, an example cleaning robot is shown in side perspective view. Cleaning robot 100 can be configured to clean a bathroom, other indoor region, or any other suitable area or region autonomously. Cleaning areas and regions can include bathrooms, for example, as well as kitchens, dining rooms, living rooms, bedrooms, hallways, laundry rooms, janitorial spaces, manufacturing spaces, loading docks, lobbies, conference and meeting rooms, patios, porches, gazebos, and decks, among other possible areas or regions to be cleaned. Cleaning robot 100 can have various major components that can include a main body 110, a mobility module 120, a robotic arm 130, a plurality of different cleaning tools 140, a tool change module 150, 160, 170, and a door opening module 180, among other possible major components.

Although not detailed in FIG. 1, it will be readily appreciated that cleaning robot 100 can include a variety of ports, hoses, couplers, wires, and other items to couple and facilitate the distribution and collection of liquids, air, power, communications, and other fluids and items from one part of the cleaning robot to another, as well as from other items outside of the robot to and from the cleaning robot. For example, multiple flexible fluid hoses (such as partially shown hose 101, for example) can extend from multiple ports (such as port 102, for example) on main body 110 to one or more of multiple cleaning tools 140 to provide and/or remove water, cleaning fluids, air, and other fluids to and from any cleaning tools that use these fluids. Other ports and hoses can extend from other locations along main body 110, mobility module 120, or both.

Main body 110 can have a main outer housing that can have one or more removable panels or other components to facilitate access to internal portions of the main body. This main outer housing or other exterior of main body 110 can contain a plurality of internal components configured to facilitate the autonomous cleaning of an indoor region, such as a bathroom, or any other suitable room, area, or region to be cleaned. Mobility module 120 can be coupled to main body 110, such as below the main body, and can be configured to move cleaning robot 100 autonomously across a floor within the bathroom or other area or region to be cleaned. In some embodiments, mobility module 120 can be within or integrally formed with main body 110.

Robotic arm 130 can have a fixed end, a movable end, and multiple movable arm segments. The fixed end can be coupled to main body 110, mobility module 120, or any other suitable location on cleaning robot 100. The movable end can be configured to move through multiple degrees of freedom relative to the fixed end by way of the multiple movable arm segments between the fixed end and the movable end, such that robotic arm 130 is configured to facilitate the autonomous cleaning of a bathroom or other room, area, or region to be cleaned. The plurality of different cleaning tools 140 can be removably mounted to respective mounting locations along one or more outer surfaces of main body 110, mobility module 120, elsewhere on cleaning robot 100, or any combination thereof. Each of the different cleaning tools 140 can be configured to be removed from its respective mounting location and manipulated by robotic arm 130 to perform a cleaning function within the bathroom or other area or region to be cleaned.

Tool change module 150, 160, 170 can include multiple separate components that are collectively configured to facilitate securely coupling and uncoupling robotic arm 130 to each of the plurality of different cleaning tools 140. These multiple separate components can include a robotic arm coupler 150 located on robotic arm 130, a separate tool coupler 160 located on each of the plurality of different cleaning tools 140, and a separate mounting component 170 located at each respective mounting location on cleaning robot 100. It will be understood that not every separate tool coupler 160 and mounting component 170 has been called out in FIG. 1 for purposes of simplicity in illustration. Door opening module 180 can be configured to pull and hold open a spring-loaded door autonomously while mobility module 120 moves cleaning robot 100 autonomously through the open spring-loaded door between the area or region to be cleaned and another region. Various further items, features, and functions of these major components of cleaning robot 100 are provided in greater detail below with respect to the detailed description of bathroom cleaning robot 300 and its modules and components.

Figure 2:
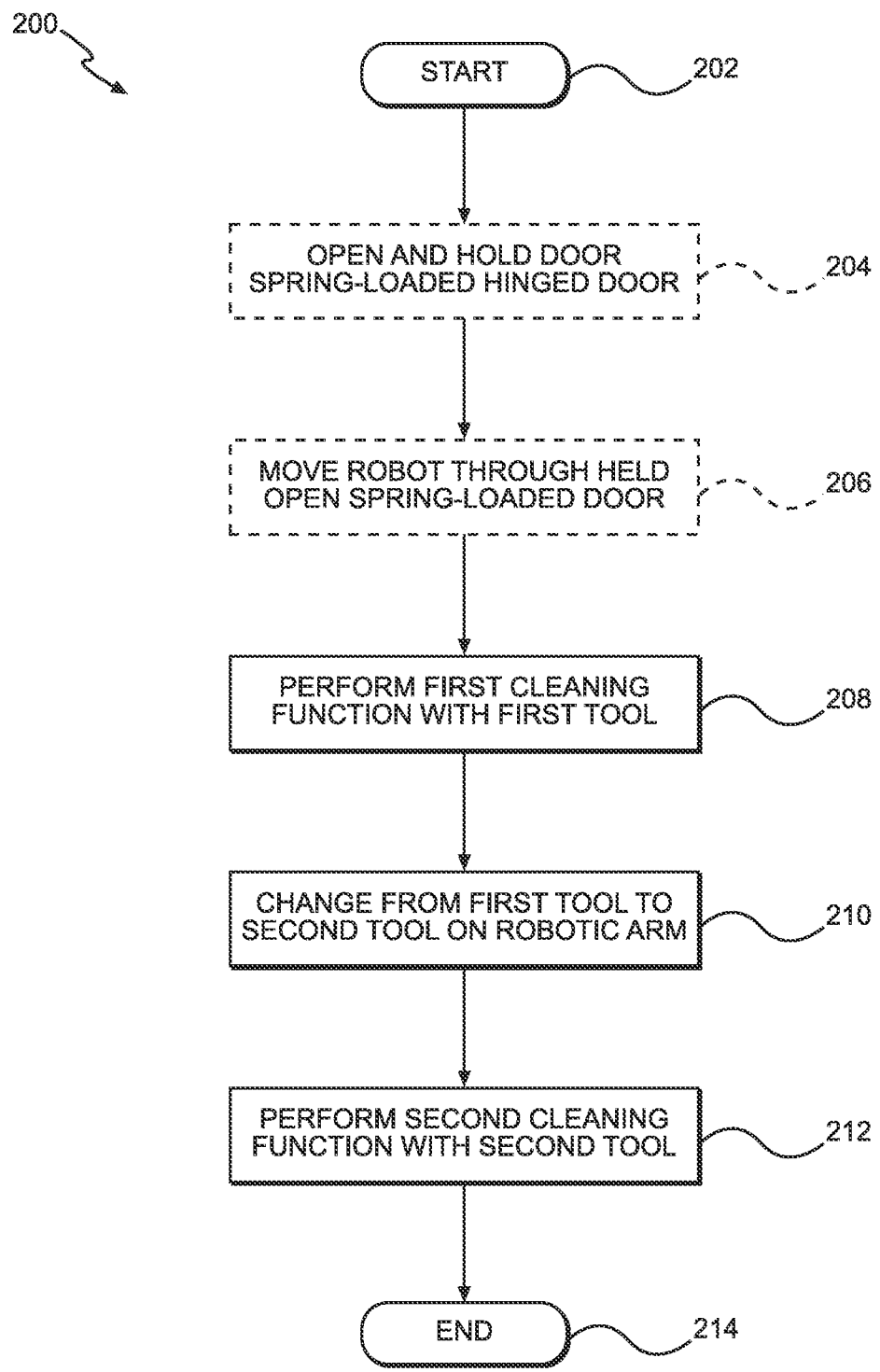
FIG. 2 illustrates a flowchart of an example summary method of cleaning an indoor region using an autonomously functioning cleaning robot according to one embodiment of the present disclosure.
Figure 3A:
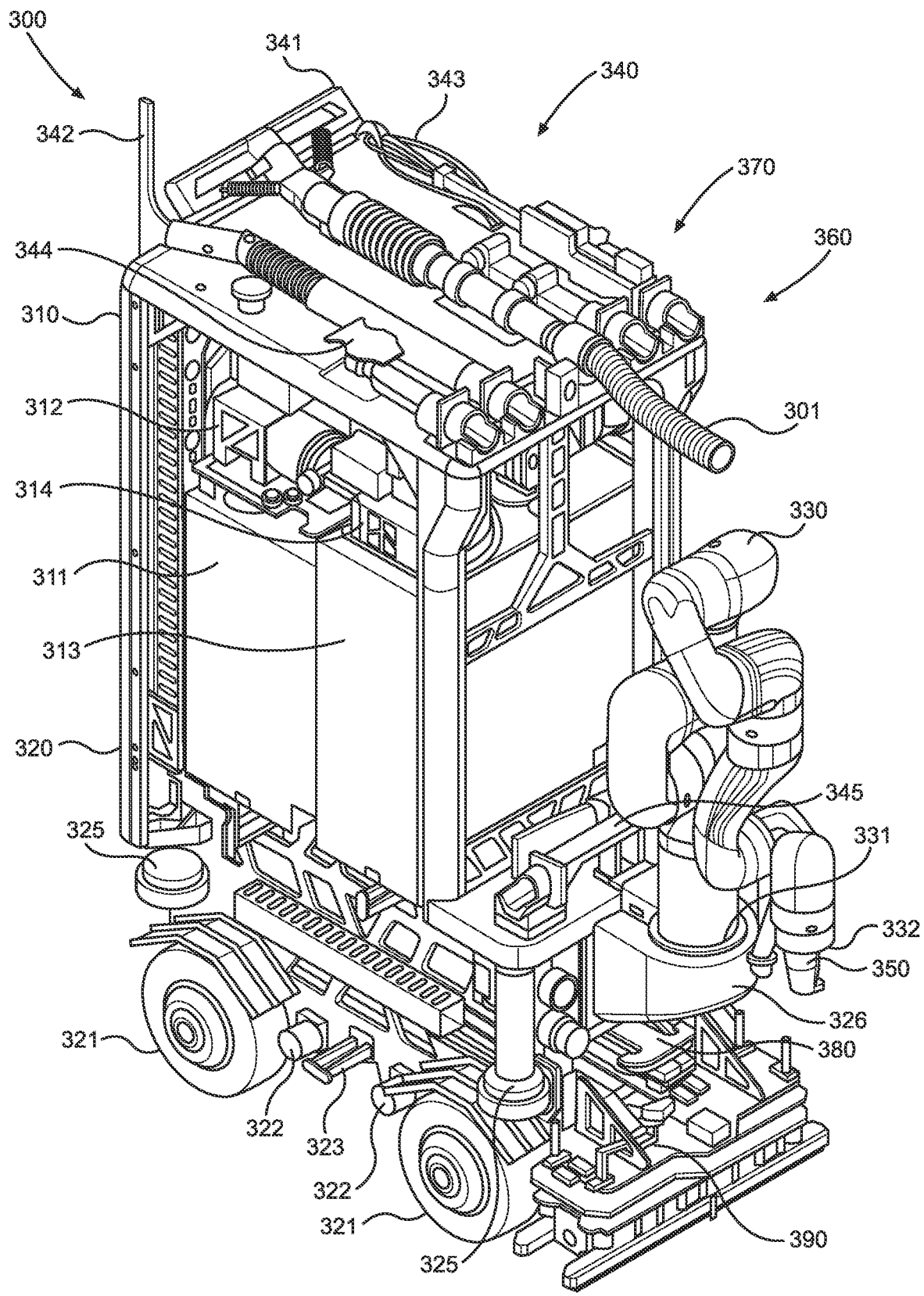
FIG. 3A illustrates in front perspective view an example bathroom cleaning robot with certain portions removed according to one embodiment of the present disclosure.
Figure 3B:
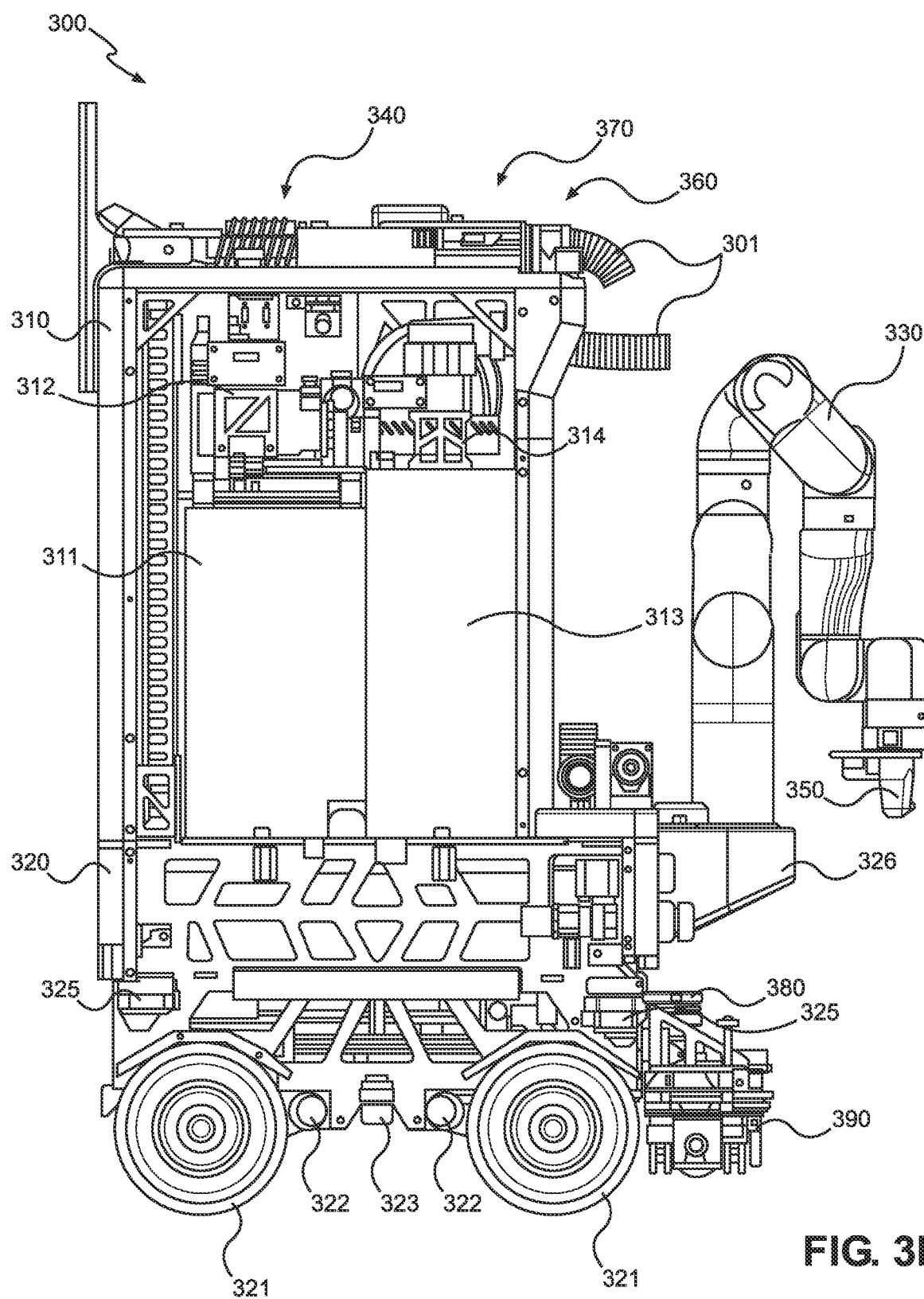
FIG. 3B illustrates in left side elevation view the bathroom cleaning robot of FIG. 3A according to one embodiment of the present disclosure.
Figure 3C:
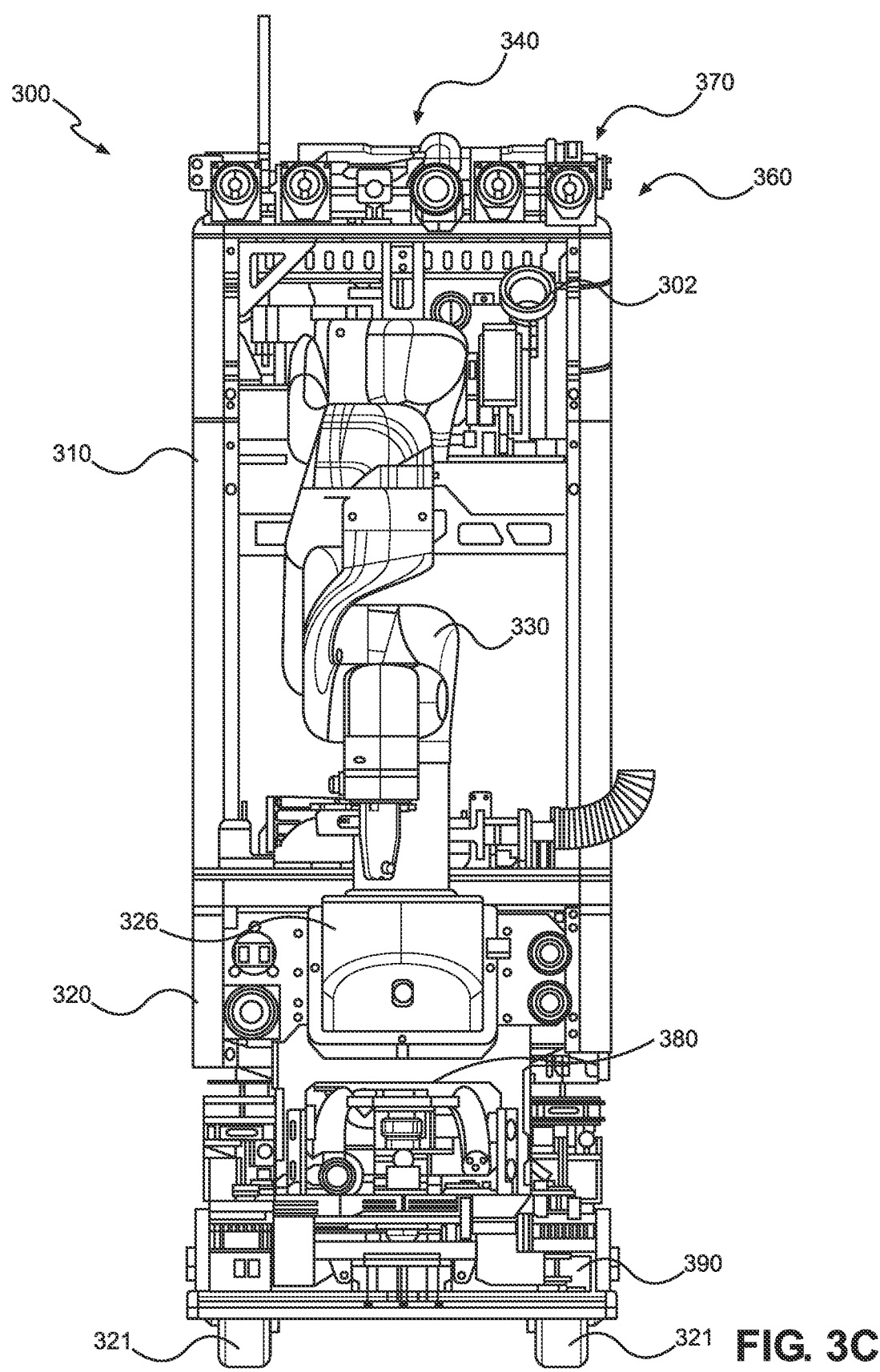
FIG. 3C illustrates in front elevation view the bathroom cleaning robot of FIG. 3A according to one embodiment of the present disclosure.
Figure 3D:
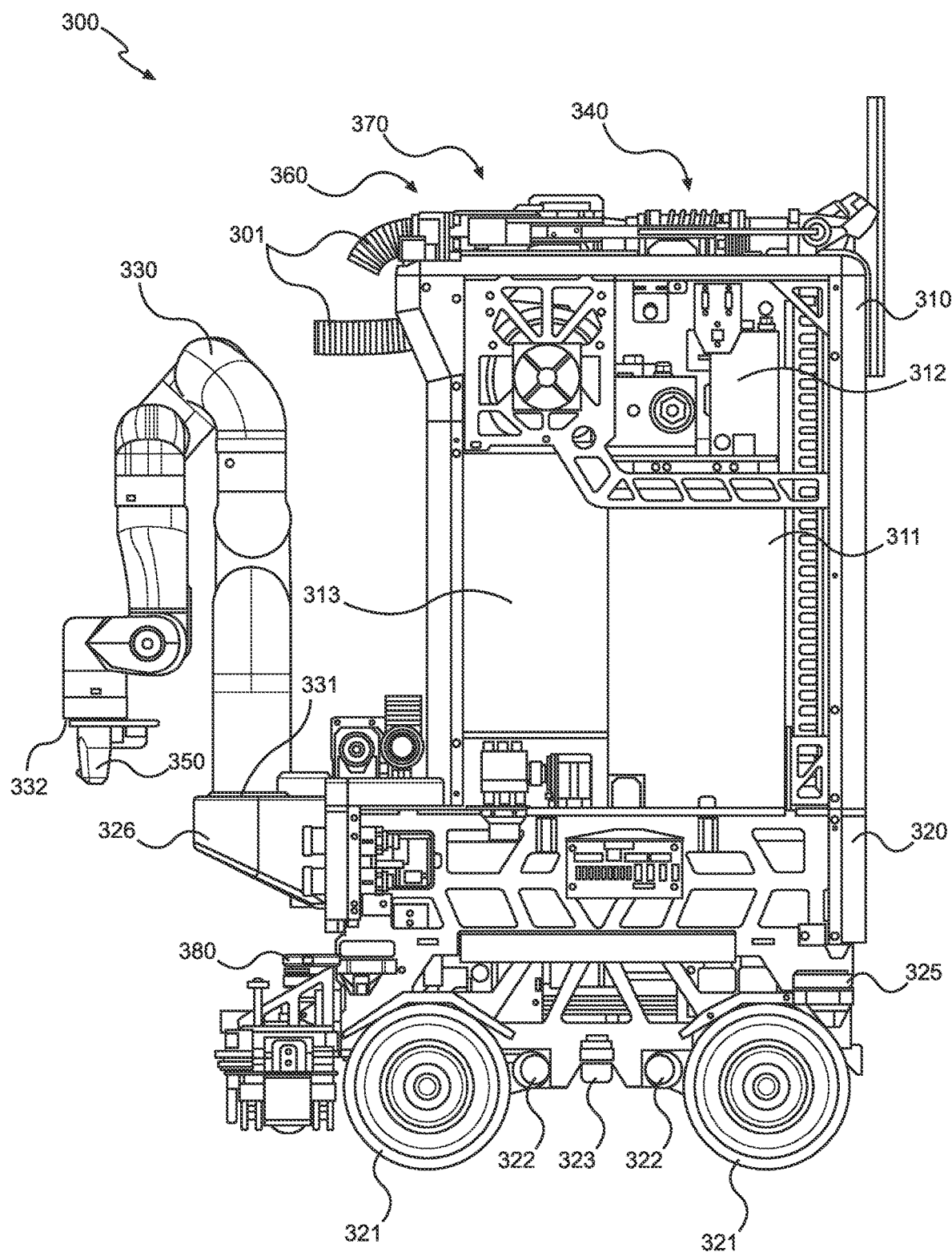
FIG. 3D illustrates in right side elevation view the bathroom cleaning robot of FIG. 3A according to one embodiment of the present disclosure.
Figure 3E:
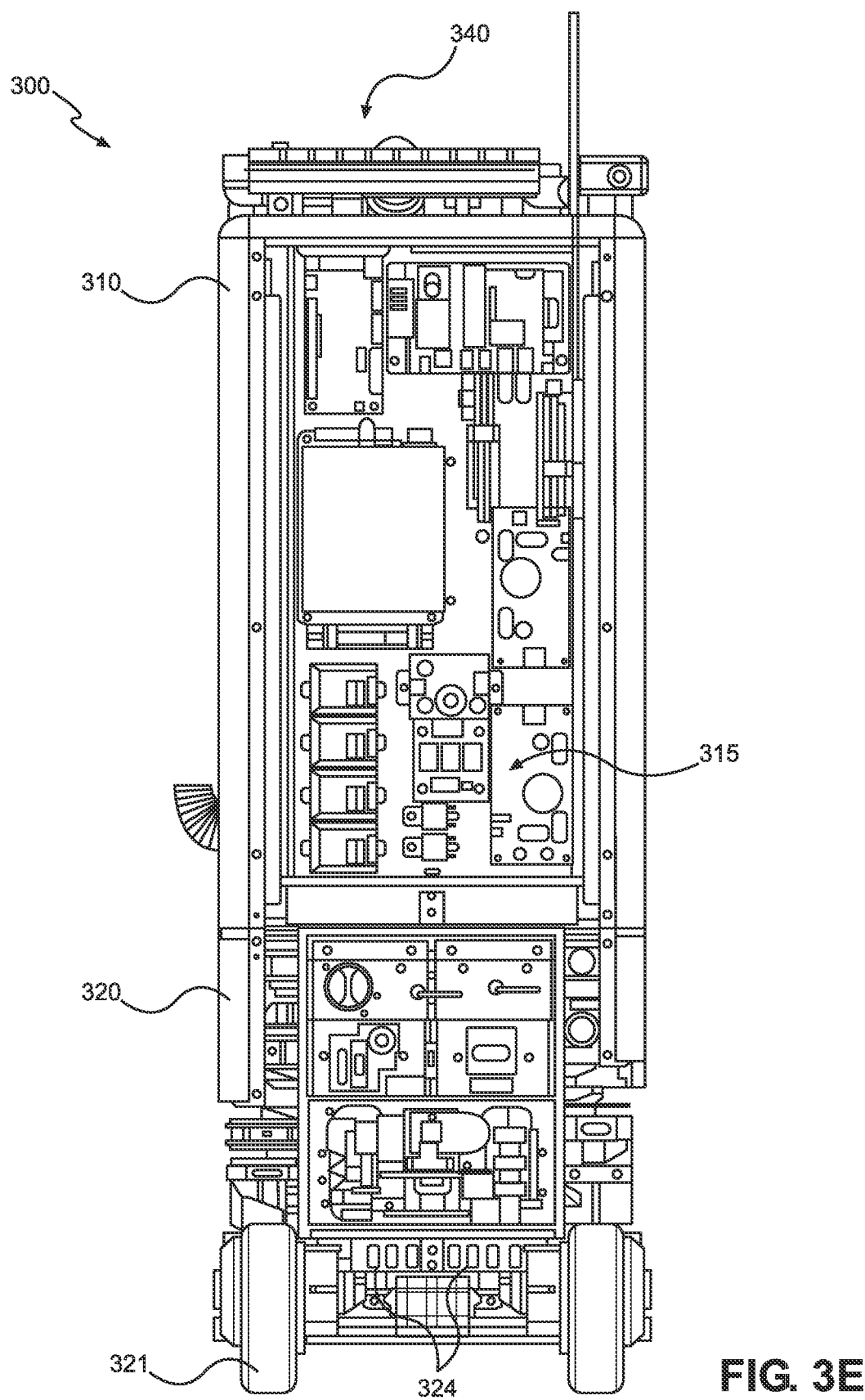
FIG. 3E illustrates in rear elevation view the bathroom cleaning robot of FIG. 3A according to one embodiment of the present disclosure.
Figure 3F:
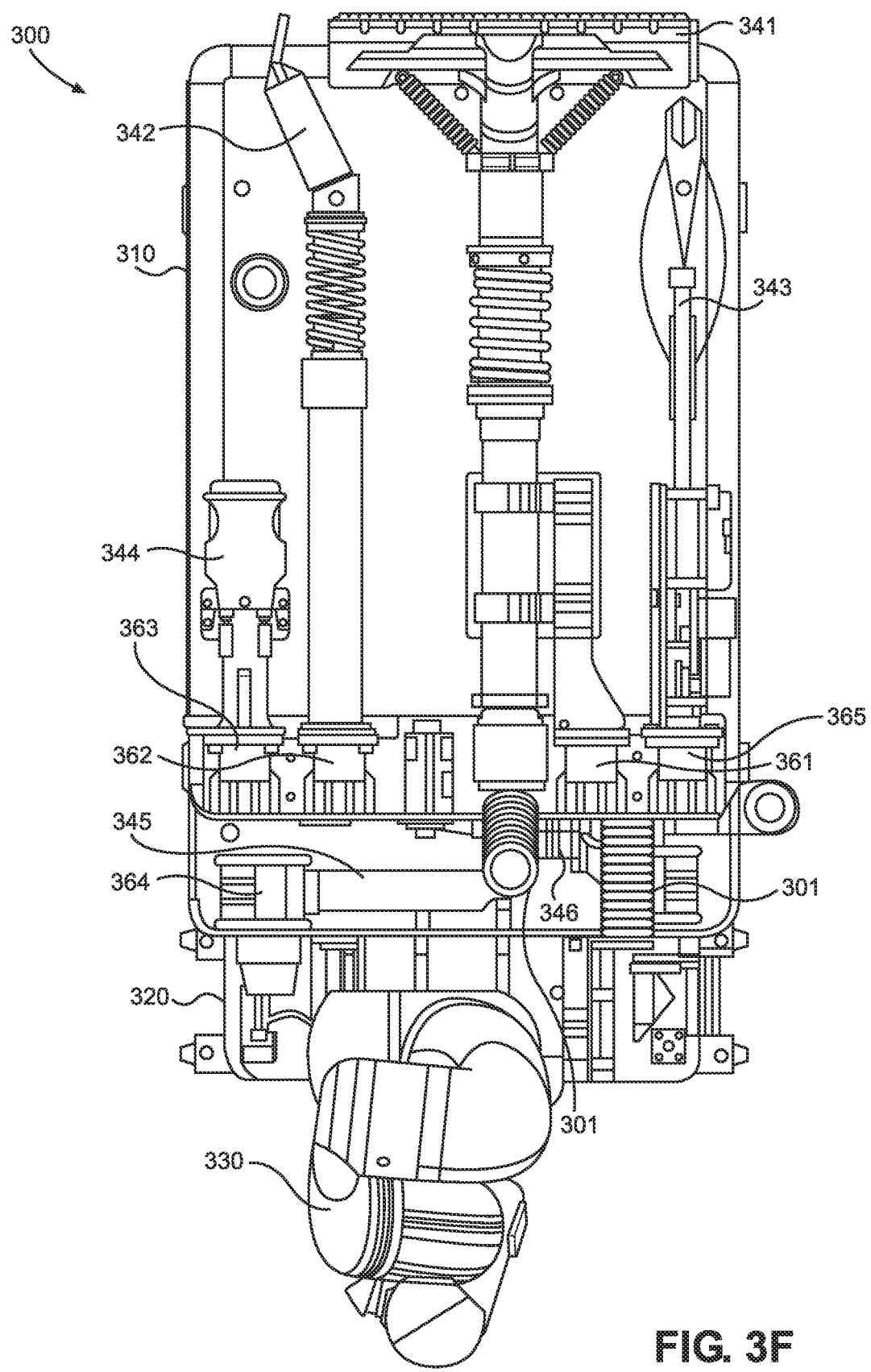
FIG. 3F illustrates in top plan view the bathroom cleaning robot of FIG. 3A according to one embodiment of the present disclosure.

Continuing with FIG. 2, a flowchart of an example summary method of cleaning an indoor region using an autonomously functioning cleaning robot is provided. It will be readily appreciated that summary method 200 can be a high level method such that one or more steps can be omitted, various other steps can be added, and/or the order of steps can be altered as may be desired. In some arrangements, the indoor region can be a bathroom and the cleaning robot can be a bathroom cleaning robot. It will also be appreciated that summary method 200 can be extrapolated to apply to an area or region other than an indoor area or region and may even apply to autonomously functioning robots that perform functions or activities other than cleaning.

After a start step 202, an optional first process step 204 can involve opening and holding open a spring-loaded hinged door. This can include, for example, opening and holding open a closed spring-loaded hinged door using a door opening module of the cleaning robot. This can involve the door opening module actuating a doorknob or handle of the door, pulling the door open, and holding the door open. The door opening module can include a robotic arm on the cleaning robot and a cleaning tool or other specific tool configured to be manipulated by the robotic arm to actuate the doorknob or handle. Alternatively, or in addition, the door opening module can include an extendable foot arrangement located on, about, or within the cleaning robot that is configured to extend to move behind the opened door and to hold it open. Step 204 can be automatically performed by the cleaning robot.

A subsequent optional process step 206 can involve moving the cleaning robot through the open spring-loaded hinged door. This can include, for example, moving the cleaning robot through the open door using a mobility module of the cleaning robot. The mobility module can include one or more wheels, motors, drive components, power supplies, sensors, and/or processors, and can be located at the bottom of the cleaning robot, for example. The mobility module can also be used to move the cleaning robot across one or more floors outside the indoor region to be cleaned to get to the door, as well as to move the robot around the floor within the indoor region to be cleaned. Step 206 can be automatically performed by the cleaning robot.

At process step 208, a first cleaning function within the indoor region can be performed with a first cleaning tool. The first cleaning tool can be removably coupled to a robotic arm of the cleaning robot, and the robotic arm can be used to manipulate the first cleaning tool to perform the first cleaning function. The first cleaning tool can be any of a variety of possible cleaning tools, and the first cleaning function can be any of a variety of possible cleaning functions, various examples and details for both of which are provided below. Step 208 can be automatically performed by the cleaning robot.

At a following process step 210, the first cleaning tool can be changed to a second cleaning tool on the robotic arm. This tool change can involve the use of a tool change module on the cleaning robot, as well as the robotic arm and other components configured to facilitate a secure tool change. As detailed below, the tool change module can include multiple separate components that are collectively configured to facilitate securely coupling and uncoupling the robotic arm to each of the first and second cleaning tools. Tool changing can include other different cleaning tools in some arrangements. Using the tool change module, the robotic arm can place the first cleaning tool onto a first docking location located on the cleaning robot, uncouple the first cleaning tool from the robotic arm while the first cleaning tool is placed onto the first docking station, couple the robotic arm to a second cleaning tool while the second cleaning tool is located at a second docking location located on the cleaning robot, and remove the second cleaning tool from the second docking location while the second cleaning tool is coupled to the robotic arm. Step 210 can be automatically performed by the cleaning robot.

At the next process step 212, a second cleaning function within the indoor region can be performed with the second cleaning tool coupled to the robotic arm. The second cleaning tool can be different than the first cleaning tool and the second cleaning function can be different than the first cleaning function. The second cleaning tool can be any of a variety of possible different cleaning tools, and the second cleaning function can be any of a variety of possible different cleaning functions, various examples and details for both of which are provided below. Step 212 can be automatically performed by the cleaning robot. The method can then end at end step 214.

In various embodiments, some steps can be performed simultaneously. For example, steps 204 and 206 can be performed at the same time. In addition, not all steps may be needed for some methods, and the order of steps can be altered as may be practical or optimal for a given process. Additional steps or functions can also be included as may be desired. For example, third and subsequent cleaning functions using third and subsequent cleaning tools can be added, as well as tool changes for such additional cleaning functions and cleaning tools. Further steps can involve removably coupling the first cleaning tool to the robot arm before performing the first cleaning function, as well as uncoupling the second cleaning tool from the robotic arm after performing the second cleaning function. Other steps can involve moving the cleaning robot across floors within and outside of the area or region to be cleaned. Added method steps can involve the functioning of items and features within the door opening module, the tool change module, or both. Other steps can involve functional details regarding sensors, feedback, communications, and other processor functions. Still other steps can involve recharging batteries or power supplies, providing clean water and cleaning fluids, emptying dirty water, and other before and after maintenance functions. Further examples of additional steps and functions can be determined and extrapolated from the various items, features, and details provided below.

Moving next to FIGS. 3A through 3F, an example bathroom cleaning robot is illustrated in front perspective, left side elevation, front elevation, right side elevation, rear elevation, and top plan views respectively. Bathroom cleaning robot 300 can be identical or substantially similar to cleaning robot 100 above in some or all regards and can vary in some details or regards. Similarly, various features, functions, and details provided with respect to bathroom cleaning robot 300 and its modules and components can be applied to general cleaning robot 100 disclosed above. As shown in FIGS. 3A through 3F, bathroom cleaning robot 300 can include various major components such as main body 310, mobility module 320, robotic arm 330, multiple different cleaning tools 340, tool change module 350, 360, 370, door opening module 380, and floor vacuum head 390, among other possible major components.

Bathroom cleaning robot 300 can also include various hoses, ports, couplers, wires, and other items to couple and facilitate distribution and collection of liquids, air, other fluids, power, communications, and other items from one part of the bathroom cleaning robot to another, as well as from other items outside of the bathroom cleaning robot to and from the bathroom cleaning robot. For example, flexible fluid hose 301 can couple the specific vacuum tool 341 to dirty water intake port 302 located along the front of main body 310. Flexible fluid hose 301 can be considerably lengthy to facilitate greater robotic flexibility and function. As such, not all of flexible fluid hose 301 is shown in FIGS. 3A-3F for purposes of simplicity in illustration, and it will be understood that this fluid hose can hang downward or otherwise loop in place around itself or another resting area when not extended or otherwise in use by the robot.

Other flexible fluid hoses, sections of tubing, wires, and other connectors not shown for purposes of illustration can similarly extend from other locations along main body 110, mobility module 120, or both to couple external ports along the robot 300 with cleaning tools and other items, as will be readily appreciated. Such external ports can include, for example, dirty water intake port 302, as well as an electrical port, cleaning fluid intake port, clean water intake port, dirty water discharge port, vacuum port, and/or blower port, among other possible ports, inlets, and outlets to the robot 300. Other general features can also be located about the exterior of bathroom cleaning robot 300, such as one or more vents, decorative items, and assorted couplers and fasteners, as will be readily appreciated.

Main body 310 can include a main outer housing that can have one or more panels (not shown) or other components that can be removed to facilitate access to internal portions of the main body. As shown in FIGS. 3A-3F, various panels along the exterior of main body 310 and mobility module 320 have been removed to provide access to various internal components of both. Internal components located within main body 310 can include, for example, fresh water tank 311 configured to hold fresh water, fresh water pump 312 configured to pump water from the fresh water tank, at least one chemical tank 313 configured to hold one or more cleaning fluids or chemicals, mixer 314 configured to mix the one or more cleaning fluids or chemicals with fresh water, a dirty water tank configured to hold dirty water, vacuum pump configured to suck dirty water into the dirty water tank, blower configured to generate an external airflow, and an electronics region 315 including one or more processing components configured to control some or all of the various autonomous functions of bathroom cleaning robot 300, among other possible internal components and features.

Mobility module 320 can be coupled to main body 310, such as below the main body, and can be configured to move bathroom cleaning robot 300 autonomously across floors within and outside the bathroom or other area or region to be cleaned. Mobility module 320 can be located with respect to main body 310 at other places besides below the main body, and in some embodiments the mobility module can be within or integrally formed with main body 310. Similar to main body 310, mobility module 320 can have its own outer housing that can include one or more panels or other components that can be removed to provide access to internal regions within the mobility module.

Mobility module 320 can also include a plurality of wheels 321, a separate motor 322 for each wheel, suspension 323, one or more batteries 324, and one or more sensors 325, among other possible components and items. Each motor 322 can be configured to drive its respective wheel 321 forward and backward independently. Suspension 323 can suspend, absorb shocks, and provide some flexibility for wheels 321 with respect to the rest of mobility module 320 collectively, individually, or both. One or more batteries 324 can be configured to power each of the separate motors 322. One or more sensors 325 can be configured to detect the location of mobility module 320 and overall bathroom cleaning robot 300 with respect to separate items within the bathroom or other area to be cleaned. Sensors 325 can include, for example, one or more cameras, lasers, radar units, lidar units, or the like, and each sensor can be coupled to one or more processing components within bathroom cleaning robot 300.

In some embodiments, mobility module 320 can include a robotic arm mount 326 that protrudes from the upper front of the mobility module to provide support for robot arm 330. This robotic arm mount 326 can be mechanically configured to support robotic arm 330, to facilitate the rotation of fixed end 331 of the robotic arm along a vertical axis, and to provide communications from one or more processing components within bathroom cleaning robot 300 to the various joints, arm segments, and other moving parts of the robotic arm, as well as tool change module 350 and its associated items located at moveable end 332 of the robotic arm.

Robotic arm 330 can be configured to facilitate the autonomous cleaning of a bathroom or other area or region to be cleaned, which can involve the manipulation and use of various cleaning tools 340, such as the specific cleaning tools 341-346 set forth below. Robotic arm 330 can include a fixed end 331 coupled to main body 310 or mobility module 320, a movable end 332 configured to move through multiple degrees of freedom relative to the fixed end, and multiple movable arm segments 333 between the fixed end and the movable end. In some arrangements, fixed end 331 can be mounted to a robotic arm mount 326 that extends from the upper front of mobility module 320, as shown. Each movable arm segment 333 can be coupled in series at both of its ends to robotic arm mount 326, another movable arm segment, or movable end 332 of robotic arm 330, and each coupling can provide for rotational movement between a given movable arm segment and its neighbors on both ends thereof.

As will be readily appreciated, additional degrees of freedom of movement can be obtained by using additional movable arm segments 333 on robotic arm 330. By including seven movable arm segments, for example, seven degrees of freedom for the overall movement of robotic arm 330 can be obtained. This can allow for the precise lateral and vertical positioning, orientation, and direction of movement for movable end 332 and any cleaning tool coupled thereto. Robotic arm 330 can be controlled by one or more general or dedicated processors that can be located on or within the robotic arm, at a location within bathroom cleaning robot 300, such as electronics region 318, remotely, or any combination thereof. In various embodiments, robotic arm 330 can be a model xArm7 robotic arm made by Ufactory of Shenzhen, China, for example, although any other suitable robotic arm could also be used for the disclosed cleaning robots. Other functions and arrangements for a robotic arm are also possible.

Cleaning tools 340 can include a variety of multiple different specific cleaning tools, each of which can be separately mounted to bathroom cleaning robot 300, removed therefrom by robotic arm 330, operated to perform a cleaning function, and remounted to the robot. Each cleaning tool 340 can generally have a specific cleaning end effector at or proximate a first distal end of the cleaning tool and a tool coupler at or proximate a second opposing distal end of the cleaning tool to facilitate the removable coupling of the cleaning tool to robotic arm 330 and one or more programmed manipulations of the robotic arm to facilitate cleaning operations while attached thereto. As shown, each of cleaning tools 340 can be mounted to an outer surface of bathroom cleaning robot 300, such as along the tops of main body 310, mobility module 320, or both. Other suitable mounting locations are also possible, such as along the sides of the robot.

In some arrangements, one or more of multiple cleaning tools 340 can also be coupled to a flexible hose to provide and/or remove air, clean water, cleaning fluids, water and cleaning fluid mixtures, dirty water, other fluids, or any suitable combination thereof. In such arrangements, the flexible hose can couple to a distal end of the cleaning tool opposite the cleaning end effector distal end. A hollow region extending through the cleaning tool can then facilitate the travel of fluids from one distal end of the cleaning tool to the other. A separate coupling component can also be attached to the cleaning tool alongside the second distal end when the second distal end is coupled directly to a flexible hose. Such a separate coupling component can include the tool coupler to facilitate removable coupling to the robotic arm, as set forth in FIG. 4A and its detailed description below.

Specific cleaning tools provided from the general set of multiple different cleaning tools 340 can include, for example, a vacuum tool 341, a squeegee tool 342, a gripping tool 343, a spraying tool 344, a blowing tool 345, and a hooking tool 346. It will be readily appreciated that not all of specific cleaning tools 341-346 need be included and/or that other types of cleaning tools may similarly be used with a given bathroom cleaning robot 300. Some cleaning tools can be coupled to a flexible hose to facilitate the passage of fluids, such as vacuum tool 341, spraying tool 344, and blowing tool 345, for example. Other cleaning tools are not coupled to a flexible hose, such as squeegee tool 342, gripping tool 343, and hooking tool 346, for example. Cleaning tools that do not use a flexible hose can couple directly to robotic arm 330, while cleaning tools that do utilize a flexible hose can couple directly to the flexible hose and couple indirectly to robotic arm 330 by way of an attached bracket arrangement, as detailed below.

Vacuum tool 341 can be used to remove water and other fluids from countertops, fixtures, floors, and the like. Squeegee tool 342 can be used to wipe clean mirrors, windows, countertops, fixtures, walls, floors, and other surfaces, as will be readily appreciated. Gripping tool 343 can be used to grip and hold objects, such as handles, levers, buttons, dispensers, garbage, signs, and other items. Various details and functions of specific cleaning tools 341, 342, and 343 will be readily appreciated by those of skill in the art.

Spraying tool 344 can include two inlets to provide clean water and cleaning fluid along separate inlets and feed lines. Spraying tool 344 can be used to spray these fluids onto various fixtures and surfaces to be cleaned. In some arrangements, spraying tool 344 can include a hook mechanism along its upper surface, and this hook mechanism can be used to move or manipulate one or more objects to facilitate cleaning. For example, this hook mechanism can be used to lift or pull down a toilet seat so that spraying tool 344 can then spray the underside of and beneath the lifted toilet seat. Moving and manipulating objects can be accomplished by way of moving the robotic arm while spraying tool 344 is coupled thereto, such that the hook mechanism can be positioned and moved properly to affect the desired object movement.

Blowing tool 345 can be used with forced air to blow dry countertops, fixtures, floors, and the like. Hooking tool 346 can be used to hook and manipulate objects, such as door handles, doorknobs, outer doors, stall doors, toilet handles, and the like. In some arrangements, for example, hooking tool 346 can be used to open the handle or doorknob of a closed door. As such, hooking tool 346 and robotic arm 330 can be considered to be part of the door opening module set forth in detail below in situations where the hooking tool is used to open the door.

Figure 4A:
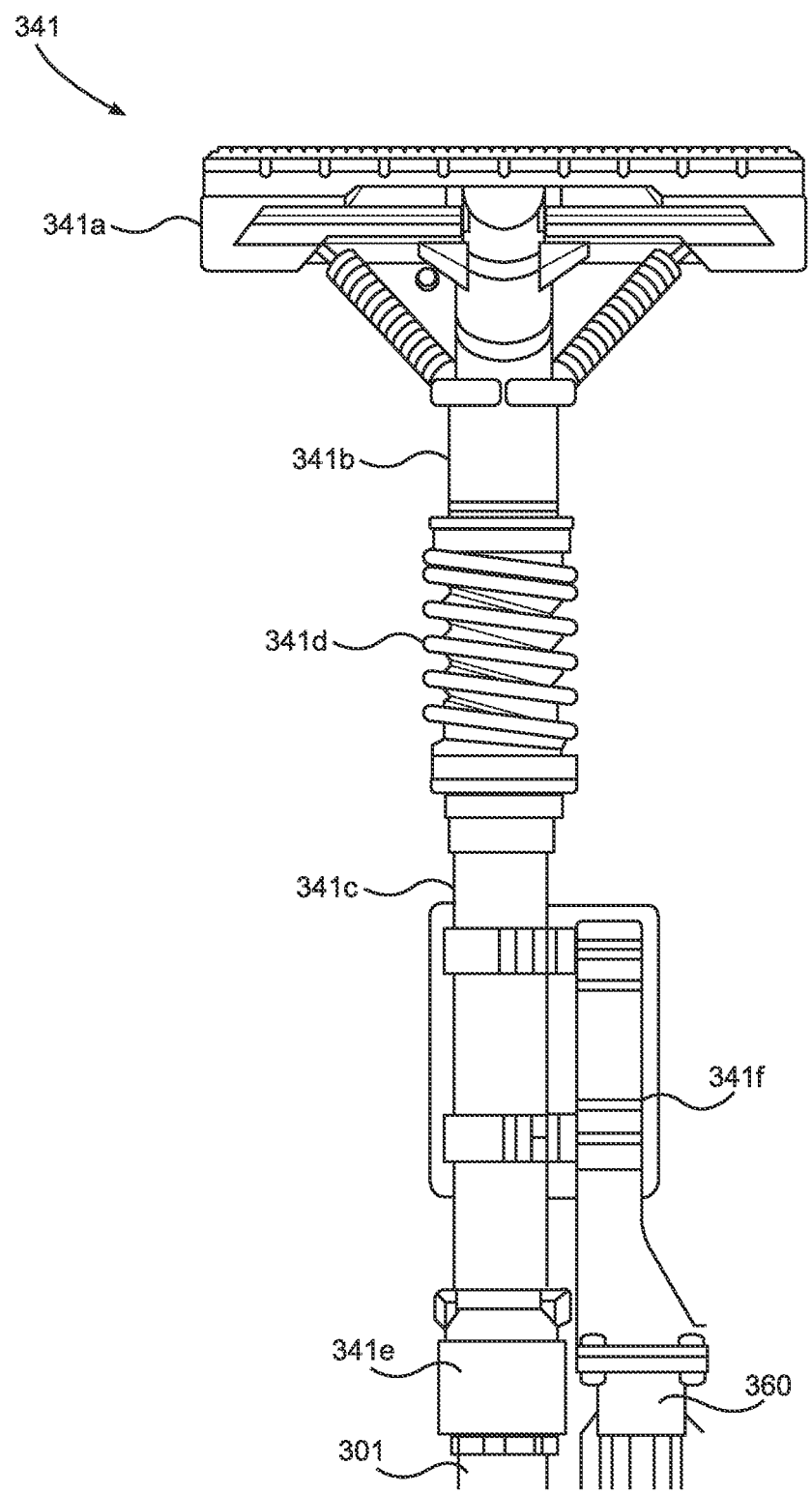
FIG. 4A illustrates in top plan view an example cleaning tool having a flexible midsection according to one embodiment of the present disclosure.

FIG. 4A illustrates in top plan view an example cleaning tool having a flexible midsection. The cleaning tool shown in FIG. 4A can be a vacuum tool 341 configured to engage with a surface to be cleaned to wipe and vacuum fluids therefrom, as will be readily appreciated, although various other types of cleaning tools are also possible. Vacuum tool 341 can include a cleaning end effector 341a, a first rigid segment 341b, a second rigid segment 341c, a flexible coupling component 341d, a hose coupler 341e, a bracket arrangement 341f, and a tool coupler 360, among other possible components. Cleaning end effector 341a can be a vacuum head located at one distal end of vacuum tool and can be coupled directly to first rigid segment 341b. Flexible coupling component 341d can be located between and coupled directly to both first rigid segment 341b and second rigid segment 341c. Hose coupler 341e can be located at the other distal end of vacuum tool 341 and can be configured to couple to a flexible hose 301 to facilitate the passing of fluids into and/or out of the vacuum tool. Hose coupler 341e can be coupled to or integrally formed with second rigid segment 341c, as shown.

As will be readily appreciated, cleaning end effector 341a, first rigid segment 341b, second rigid segment 341c, flexible midsection 341d, and hose coupler 341e can all be hollow to facilitate the passing of fluids therethrough. In the particular case of vacuum tool 341, this can involve providing a vacuum by way of a coupled vacuum hose and passing dirty water or other fluids from cleaning end effector 341a through the rest of the tool and into the vacuum hose at hose coupler 341e. In the case of other cleaning tools, air, fluids, and other liquids can similarly be passed to and from a respective cleaning end effector from and to a similar hose coupler by way of similar hollow rigid segments and a similar flexible midsection.

For cleaning tools where a hose coupler at one distal end of the cleaning tool couples to a separate flexible hose for the passing of fluids, such as in the case for vacuum tool 341, bracket arrangement 341f can be affixed or otherwise coupled to second rigid segment 341c. This bracket arrangement 341f can have a dedicated tool coupler 360 affixed or otherwise coupled to a distal end thereof to facilitate the secure removable coupling of vacuum tool 341 to a robotic arm located on the bathroom cleaning robot. Tool coupler 360 can interact with a separate robotic arm coupler on the robotic arm, as detailed below. Bracket arrangement 341f can be arranged in parallel with second rigid segment 341c such that hose coupler 341e and tool coupler 360 are located alongside each other and face the same direction. When the robotic arm is coupled to tool coupler 360, the entire vacuum tool 341 can then be manipulated and moved by the robotic arm as a combined unit in many or all possible directions and orientations to facilitate a vacuum cleaning operation with the vacuum tool. A flexible hose can remain coupled to hose coupler 341e as the entire vacuum tool 341 is moved and manipulated.

Figure 4B:
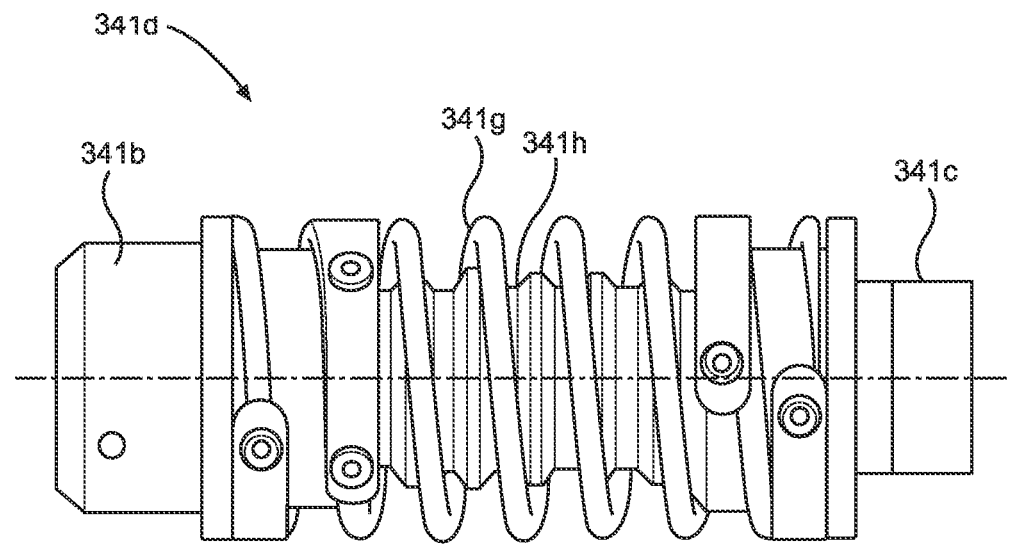
FIG. 4B illustrates in top plan view an example flexible midsection for a cleaning tool according to one embodiment of the present disclosure.
Figure 4C:
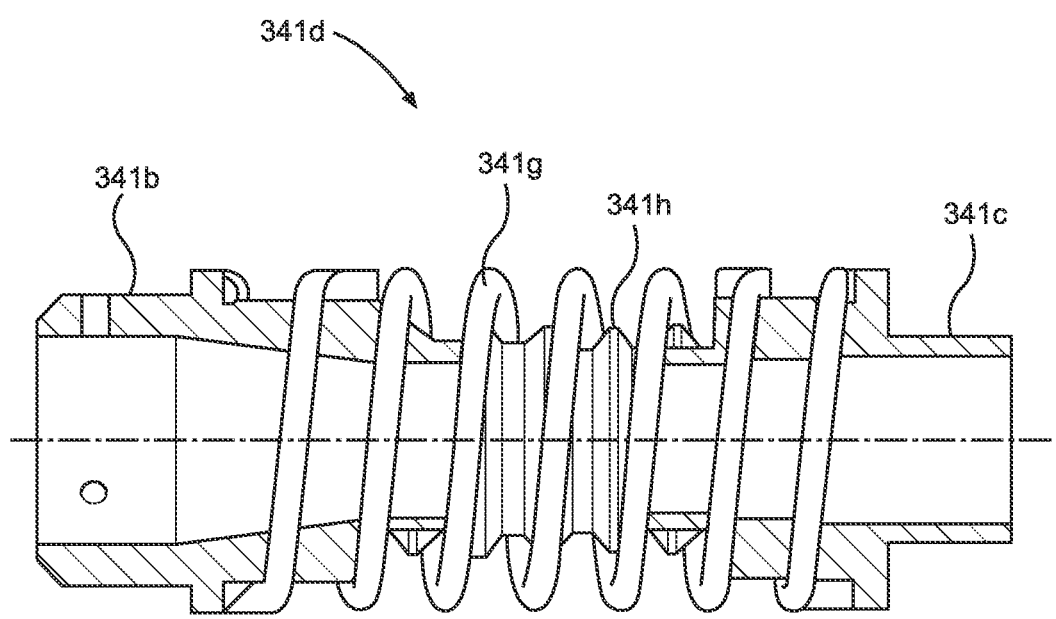
FIG. 4C illustrates in top cross-section view the flexible midsection for a cleaning tool of FIG. 4B according to one embodiment of the present disclosure.

Continuing with FIGS. 4B and 4C, an example flexible midsection for a cleaning tool is shown in top plan and top cross-section views respectively. Flexible midsection 341d can flexibly couple first rigid segment 341b with second rigid segment 341c of the overall cleaning tool such that the rigid segments can move with respect to each other by extending, contracting, or flexing at a relative angle along a longitudinal axis along the length of these components. Such relative movements can allow for greater movement and flexibility at the cleaning end effector coupled to the other end of first rigid segment 341b with respect to the robotic arm coupled to the other end of second rigid segment 341c. This flexibility can also serve to protect the rigid segments 341b, 341c from breaking or becoming damaged, since they can flex or pivot about flexible midsection 341d rather than break or crack in various operating situations.

To facilitate this flexibility in operational use of the overall cleaning tool, flexible midsection 341d can include a flexible spring 341g situated around a flexible tubing section 341h that can both be coupled to the rigid segments 341b, 341c, such as by way of pins, screws, rivets, or other suitable fastening components. Flexible tubing section 341h can be hollow to allow fluids to pass therethrough, while flexible spring 341g can provide suitable levels of protection and strength to the flexible midsection 341d. Other components and arrangements are also possible to form a flexible midsection of an elongated cleaning tool, and it will be appreciated that the various components of flexible midsection 341d and other parts of the cleaning tool illustrated in FIGS. 4A-4C can be similarly applied to other cleaning tools with different cleaning end effectors and different cleaning functions.

Various general capabilities and possible specific functions for bathroom cleaning robot 300 having a main body 310, mobility module 320, robotic arm 330, and multiple different cleaning tools 340 will now be provided. In some arrangements, bathroom cleaning robot 300 can be programmed to operate autonomously according to known configurations of one or more bathrooms and/or other areas or regions to be cleaned. Specific cleaning plans can be designed for the various floors, walls, fixtures, and other items to be cleaned, and the bathroom cleaning robot can be programmed to perform numerous functions in one or more specific or flexible manners and orders.

In some embodiments the bathroom cleaning robot can be configured and programmed to perform all operations autonomously, while other embodiments may involve some interaction with a human, such as a full or partial remote control of the robot. In such arrangements, one or more cameras, sensors, and other items can facilitate the creation of an augmented reality environment to allow a remote handler or user to understand what is happening with the robot and to provide override instructions or some other form of manual intervention or assistance. Alternatively, bathroom cleaning robot 300 can have one or more user inputs to facilitate handler or user interaction with the robot directly. These can include, for example, a manual override input for the robotic arm, one or more manual releases for the different cleaning tools, and an emergency shutoff button, among other possible features.

In various embodiments, bathroom cleaning robot 300 can be configured and programmed to clean a bathroom or other area or region completely and may also be configured and programmed for the automated refilling and discharging of fluids, recharging, restocking of disposable items, and other maintenance functions, such as at a separate maintenance or storage station for the robot. Bathroom cleaning robot 300 can have an on-board microphone that can listen to its environment. The robot can then take action when various microphone inputs are heard. For example, when a fire alarm is heard the robot can cease normal operations and may also move itself to a desirable location. As another example, the robot can pause certain cleaning functions based on hearing someone using the bathroom, such as not cleaning the floor when a user is in the bathroom or not cleaning a toilet or sink that is in use or likely about to be used.

Various sensing and detecting components and features can be implemented on bathroom cleaning robot 300 to collect whatever data is needed to understand the state of the environment being cleaned and the various modules, components, and features of the robot itself. Such sensing and detecting components can include, but are not limited to, one or more cameras, radar units, lidar units, lasers, microphones, pressure sensors, fluid fill detectors, and voltage detectors, among other possible sensors. For example, one or more pressure sensors can be located along the bottom of floor vacuum head 390 to enable the correct positioning of the floor vacuum head and to know when the floor vacuum head is flatly oriented on the floor.

In some arrangements, bathroom cleaning robot 300 can be programmed to detect problems and to assess the safety of its environment, such as being able to detect wet floors, outer and stall door positions, faucet, toilet, and blow dryer statuses, water overflow conditions, toilet seat positions, and other potentially hazardous conditions. In some situations, one or more warning signs or indicators can be implemented where warranted. For example, a yellow warning sign indicating a wet floor can be hung along an outer surface of the robot, and the robotic arm can be configured and programmed to remove and place the yellow warning sign on a wet floor when that is detected.

In various embodiments having a trash container, bathroom cleaning robot 300 can be configured to open or otherwise trigger a trash container door to open to change the trash. A grabber or gripper tool on the robot can remove the trash from the trash container and place it into a receptacle on the robot or one that the robot is carrying. The robot can also clean the trash container using chemicals, power washing, or any other suitable cleaning procedure using one or more cleaning tools on the robot. The robot can then close the trash container and can later empty the removed trash it is now holding into a central garbage receptacle or container.

In various embodiments, bathroom cleaning robot 300 can be configured with the ability to accept, store, and distribute various inserts or cartridges to resupply consumable items within a bathroom or other area or region to be cleaned. An insert or cartridge approach can allow the cleaning robot to overcome various physical issues and requirements of restocking consumable items, as well as to standardize the placements, locking mechanisms, and other features of various consumable item holders and/or dispensers. Consumable item inserts or cartridges can be stored within or about the cleaning robot in one or more readily accessible locations and can be normalized to facilitate the ready resupplying or dispensing of consumable items. In some arrangements, such inserts or cartridges can be 3D printed in small volumes to enable a vast number of sizes and shapes. Inserts and/or cartridges for consumable items can include those that can be used to resupply, for example, toilet paper, paper towels, liquid and solid soap, toilet seat covers, and sanitary pads, among other possible consumable items.

For example, bathroom cleaning robot 300 can be configured to replace toilet paper rolls where toilet paper is out or low on a given toilet paper spindle. In such arrangements, robotic arm 330 can removably couple to a grabber tool and/or a gripper tool to access a new toilet paper roll stored on the cleaning robot, to remove a wrapper therefrom, to remove a target toilet paper spindle, to remove a used or low toilet paper roll from the spindle, to put the new toilet paper roll on the spindle, and to reinstall the spindle to its proper location. Similar functions and processes can apply for the restocking or replacement of other disposable items, such as paper towels, soap, toilet seat covers, and sanitary pads.

To facilitate this autonomous functionality, bathroom cleaning robot 300 can also be configured and programmed to identify, track, and/or report the status of various consumable items. One or more sensors such as cameras or laser systems can be configured to detect and track the fill level of various consumable in one or more types of consumable dispensers. For example, during routine cleaning operations bathroom cleaning robot 300 can identify, track, and report that 50% of the toilet paper is gone from the roll in toilet stall number three and that the liquid soap level is at only 5% at sink number two in the bathroom. The robot may also be configured to detect the status of one or more consumable dispensers, such as where they are in good working condition, damaged, or broken, such that repairs or replacements can be made.

While the foregoing features and processes provide some examples of the various components, functions, and capabilities of bathroom cleaning robot 300, it will be readily appreciated that many further detailed components, functions, and capabilities are also possible, and that these and other functions and capabilities can be performed autonomously by the cleaning robot with little to no human intervention or supervision. In addition to the foregoing functions and capabilities, bathroom cleaning robot 300 can be configured to perform securely and reliably tool changes between different cleaning tools, and can also be configured to pull open, hold open, and move itself through a closed spring-loaded door. These specific cleaning robot functions can be performed autonomously using a tool change module and door opening module, such as the example provided in greater detail below.

Tool Change Module

As noted above, the disclosed bathroom cleaning robot can include a tool change module that includes various separate components configured to operate together to facilitate a reliable and secure tool change between different cleaning tools. While the term tool change and tool change module is used herein, it will be understood that the disclosed tool change module and its components can also be used simply to facilitate the removable coupling and uncoupling of a single cleaning tool in some instances. In general, the disclosed tool change module and its associated components and features can be used to couple and uncouple autonomously a single cleaning tool to and from the robotic arm of the bathroom cleaning robot. Although only one of several different possible cleaning tools can be coupled to the robotic arm for use at one time, it is contemplated that other embodiments and extrapolations of the disclosed tool change module can also be implemented for multiple cleaning tools at once. In some instances, the robotic arm could be configured with multiple robotic arm couplers to couple to multiple cleaning tools, while other cases could involve the use of multiple robotic arms.

Figure 5A:
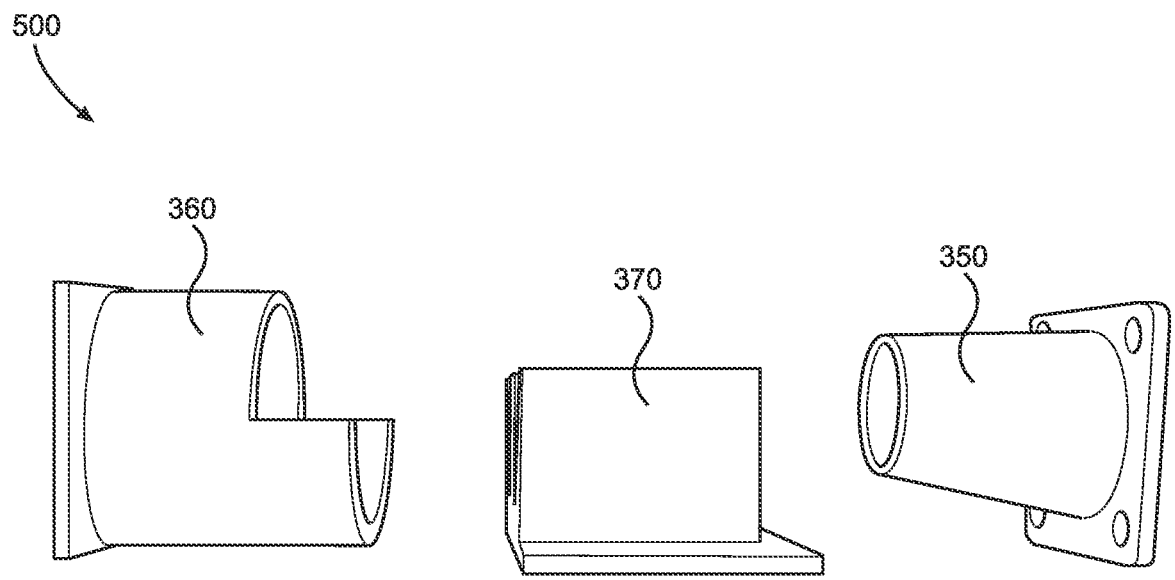
FIG. 5A illustrates in side perspective view an example tool change module with its uncoupled components in isolation according to one embodiment of the present disclosure.

Transitioning now to FIG. 5A, an example tool change module is shown with its uncoupled components in isolation in side perspective view. Uncoupled arrangement 500 depicts robotic arm coupler 350, tool coupler 360, and mounting component 370 as uncoupled from each other and separate from all other bathroom cleaning robot items and components for purposes of illustration. In various embodiments, a single robotic arm coupler 350 can be attached or otherwise coupled to a moveable end of a robotic arm of the cleaning robot, while a separate tool coupler 360 can be attached or otherwise coupled to each separate cleaning tool and a separate mounting component 370 can be attached or otherwise coupled to each separate mounting location on the bathroom cleaning robot. As such, a given bathroom cleaning robot can include one robotic arm coupler 350, multiple tool couplers 360, and multiple mounting components 370. In various arrangements, some mounting components 370 can be configured to mount and hold multiple tool couplers at a given mounting location, such that there can be fewer mounting components than tool couplers on a given bathroom cleaning robot.

Figure 5B:
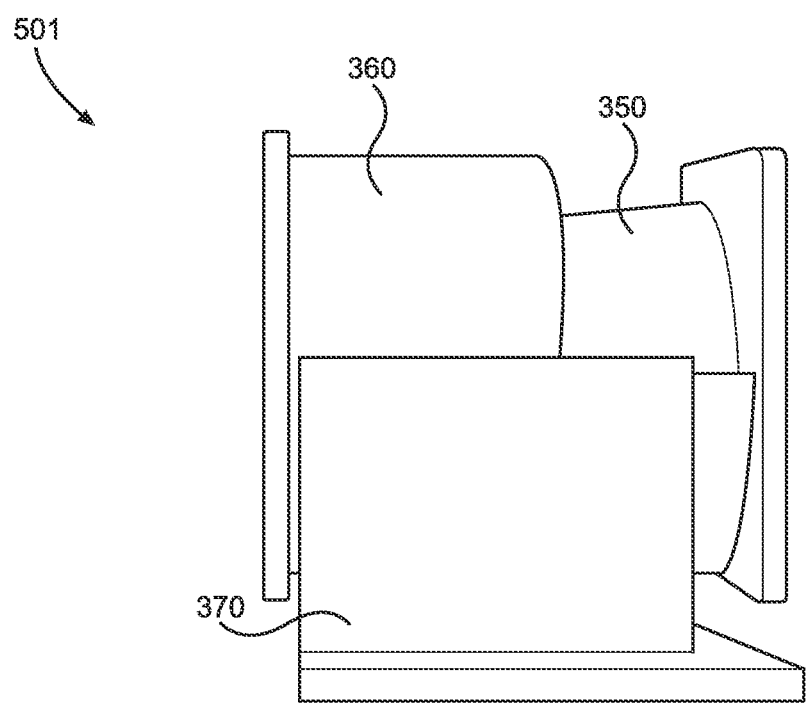
FIG. 5B illustrates in side perspective view the tool change module of FIG. 5A with its components coupled together according to one embodiment of the present disclosure.

Continuing with FIG. 5B, the tool change module of FIG. 5A is similarly illustrated in side perspective view with its components coupled together. As shown in coupled arrangement 501, extending portion of robotic arm coupler 350 can be inserted into a receiving portion of tool coupler 360, and both of these couplers can reside within a cradle of mounting component 370 when all of these components are coupled together. It will be appreciated that robotic arm coupler 350 and tool coupler 360 can be removed from and remounted to mounting component 370 while these couplers are coupled together, and that the tool coupler can ordinarily reside on the mounting component when it is not coupled to the robotic arm coupler.

Turning next to FIGS. 6A-6D, this series of figures shows an example process of coupling and uncoupling the robotic arm coupler 350 to a given tool coupler. In some arrangements, only one tool coupler and its associated cleaning tool can be coupled to the robotic arm coupler and its associated robotic arm at any given time. The example process shown in FIGS. 6A-6D can reflect an autonomous tool coupling process, which can be part of a greater tool change process, such as where a previous cleaning tool is removed prior to a newly selected cleaning tool being coupled. These tool coupling, uncoupling, and tool change processes can involve the use of other components and features beyond those shown here, such as one or more cameras or other sensors that detect accurate couplings and uncouplings, as well as one or more processors and other electronic components that facilitate robotic arm movements and any other automatic feature functions. Sensors and/or magnets can be used to accurately guide and align the various coupling and uncoupling components, and the bathroom cleaning robot can be configured to self-calibrate as may be needed to establish the precise movements required for tool changing even for new tool couplers and other components and items.

Figure 6A:
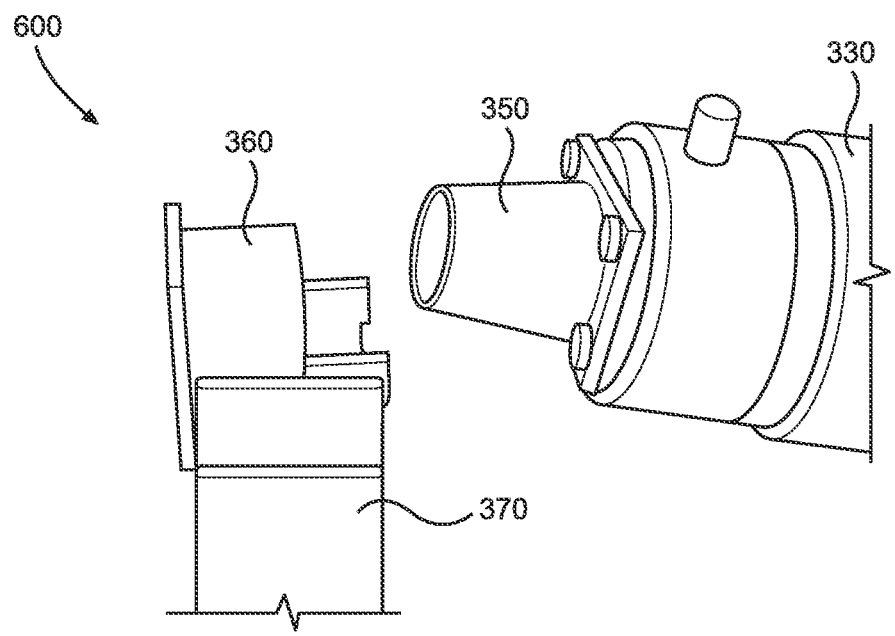
FIG. 6A illustrates in side perspective view an example tool change module with its uncoupled components fastened to a robotic arm, a cleaning tool, and an outer surface of a bathroom cleaning robot according to one embodiment of the present disclosure.

FIG. 6A illustrates in side perspective view an example tool change module with its uncoupled components fastened to a robotic arm, a cleaning tool, and an outer surface of a bathroom cleaning robot. Uncoupled arrangement 600 can involve robotic arm coupler 350 as being uncoupled from tool coupler 360. Robotic arm coupler 350 can be fastened to movable end of robotic arm 330, while tool coupler 360 can be fastened to a distal end of an associated cleaning tool (not shown) and mounting component 370 can be fastened to a mounting surface (not shown) of the bathroom cleaning robot. Tool coupler 360 can be coupled to mounting component 370 while the tool coupler is not coupled to robotic arm coupler 350, which provides a mounted and stored location for the tool coupler and its cleaning tool while not in use.

Figure 6B:
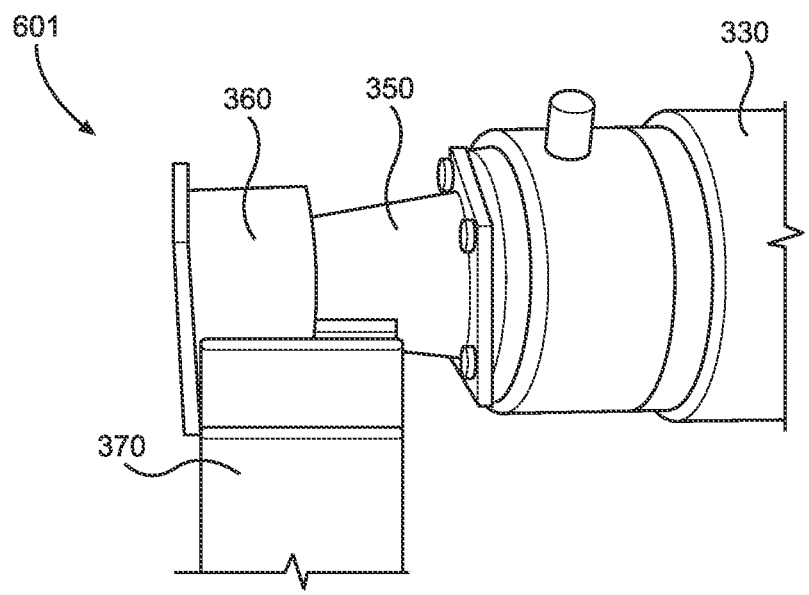
FIG. 6B illustrates in side perspective view the tool change module of FIG. 6A with the robotic arm inserting a tool change module robotic arm coupler into a tool change module tool coupler on a cleaning tool according to one embodiment of the present disclosure.

FIG. 6B illustrates in side perspective view the tool change module of FIG. 6A with the robotic arm inserting the robotic arm coupler into the tool change module tool. Coupling-in-process arrangement 601 can reflect robotic arm coupler 350 being oriented, moved, and otherwise manipulated by robotic arm 330 to insert the robotic arm coupler into tool coupler 360. Accurate insertion of robotic arm coupler 350 into tool coupler 360 can be facilitated by the geometries of these respective components, as well as by one or more embedded magnets in these components and one or more associated cameras or other sensors.

Figure 6C:
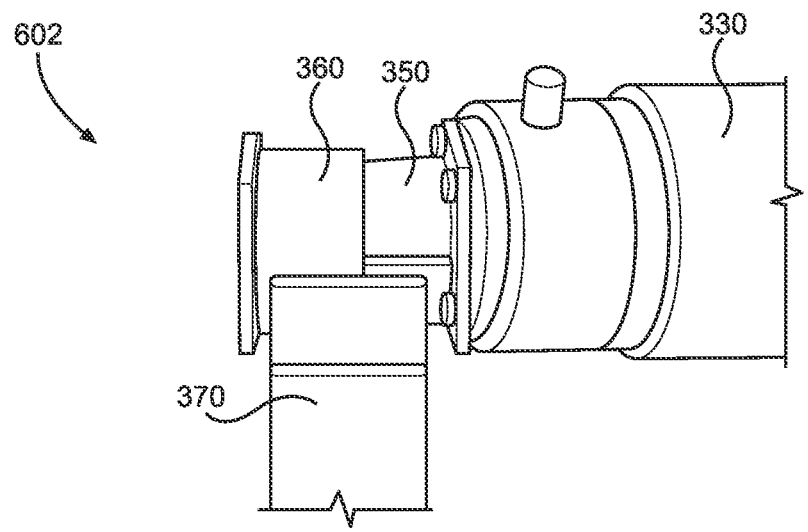
FIG. 6C illustrates in side perspective view the tool change module of FIG. 6B with the robotic arm coupler being fully coupled into the tool coupler while the tool coupler is mounted to a tool change module mounting component fastened to an outer surface of the bathroom cleaning robot according to one embodiment of the present disclosure.

FIG. 6C illustrates in side perspective view the tool change module of FIG. 6B with the robotic arm coupler being fully coupled into the tool coupler while the tool coupler is mounted to the mounting component. Newly coupled arrangement 602 can reflect a full insertion of robotic arm coupler 350 into tool coupler 360, which can result in a locking mechanism engaging to secure a removable coupling between these components. Such a locking mechanism can involve, for example, a spring loaded pin on robotic arm coupler 350 snapping into an opening within tool coupler 360, as detailed below. As shown, this removable coupling between robotic arm coupler 350 and tool coupler 360 can take place on or within mounting component 370 while the mounting component is fastened or otherwise coupled to an outer surface of the bathroom cleaning robot.

Figure 6D:
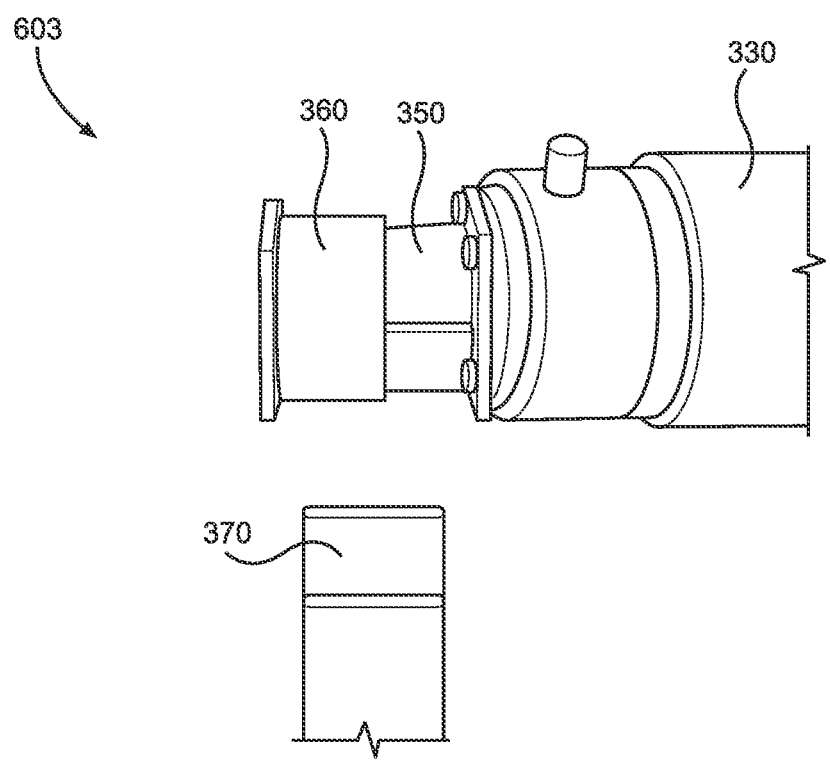
FIG. 6D illustrates in side perspective view the tool change module of FIG. 6C with the robotic arm lifting the cleaning tool from the mounting component while the robotic arm coupler and tool coupler are coupled according to one embodiment of the present disclosure.

FIG. 6D illustrates in side perspective view the tool change module of FIG. 6C with the robotic arm lifting the cleaning tool from the mounting component while the robotic arm coupler and tool coupler are coupled together. Coupled and removed arrangement 603 reflects the secure removable coupling between robotic arm coupler 350 and tool coupler 360 and the removal of these coupled components from mounting component 370. Robotic arm 330 is then free to conduct whatever manipulations, motions, and other cleaning actions desired with the given cleaning tool associated with tool coupler 360 being securely coupled to the robotic arm. As will be readily appreciated, FIGS. 6A-6D can be considered in reverse order for the uncoupling of robotic arm 330 from the cleaning tool associated with tool coupler 360.

FIGS. 7A through 7E illustrate an example robotic arm coupler of a tool change module for a bathroom cleaning robot in top plan, front elevation, side elevation, rear elevation, and side cross-section views respectively. Robotic arm coupler 350 can include a conically shaped extending portion 351, a spring-loaded pin 352 protruding therefrom, a spring 353 that biases the pin, and a robotic arm coupler flange 354 and openings 355 therethrough. Extending portion 351 can be sized and shaped to fit snugly into various tool couplers of the tool change module. Pin 352 can be configured to move laterally within an internal recess 356 within robotic arm coupler 350 and can be biased by spring 353 to protrude from conically shaped extending portion 351 when no object or force is pushing the pin inward.

Robotic arm coupler flange 354 can be used to fasten or otherwise couple robotic arm coupler 350 to the moveable end of the robotic arm by way of openings 355, which can be used with screws, nails, bolts, rivets, or other suitable fasteners or couplers. In various embodiments, a robotic arm coupler magnet 357 can be embedded within the front nose of robotic arm coupler 350. Robotic arm coupler magnet 357 can be configured to interact with one or more magnets located on a separate tool coupler and/or separate mounting component to facilitate an accurate and aligned coupling between robotic arm coupler 350 and any tool coupler mated therewith. One or more additional magnets can be used for this purpose, and other locations within or along robotic arm coupler 350 can host these aligning magnets.

Figure 7A:
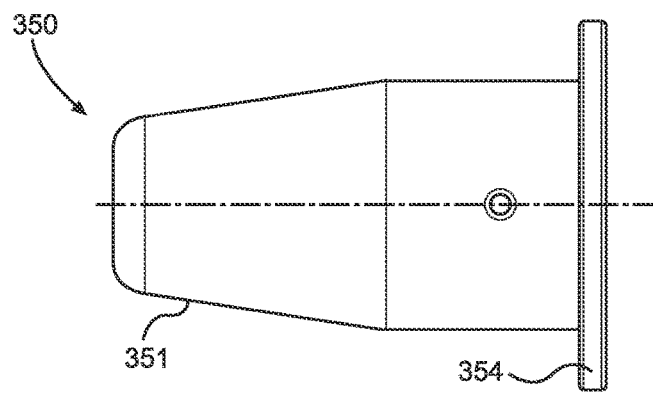
FIG. 7A illustrates in top plan view an example robotic arm coupler of a tool change module according to one embodiment of the present disclosure.
Figure 7B:
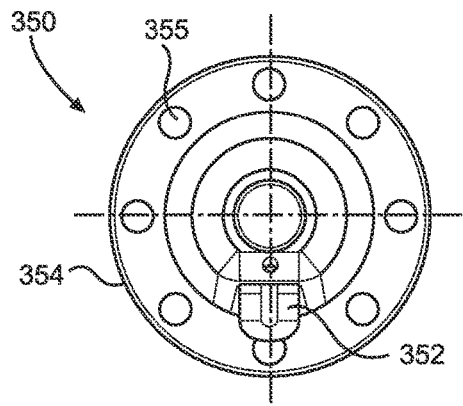
FIG. 7B illustrates in front elevation view the robotic arm coupler of FIG. 7A according to one embodiment of the present disclosure.
Figure 7C:
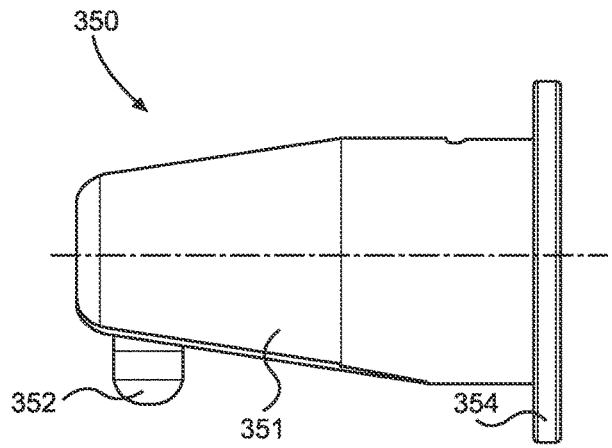
FIG. 7C illustrates in side elevation view the robotic arm coupler of FIG. 7A according to one embodiment of the present disclosure.
Figure 7D:
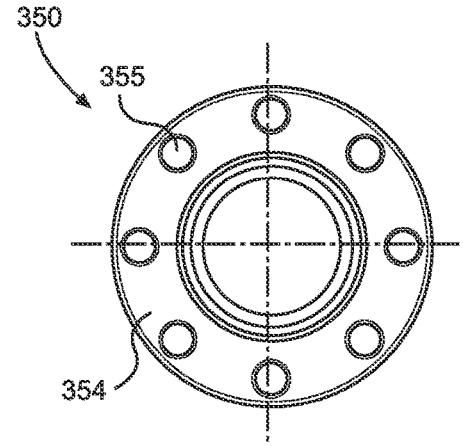
FIG. 7D illustrates in rear elevation view the robotic arm coupler of FIG. 7A according to one embodiment of the present disclosure.
Figure 7E:
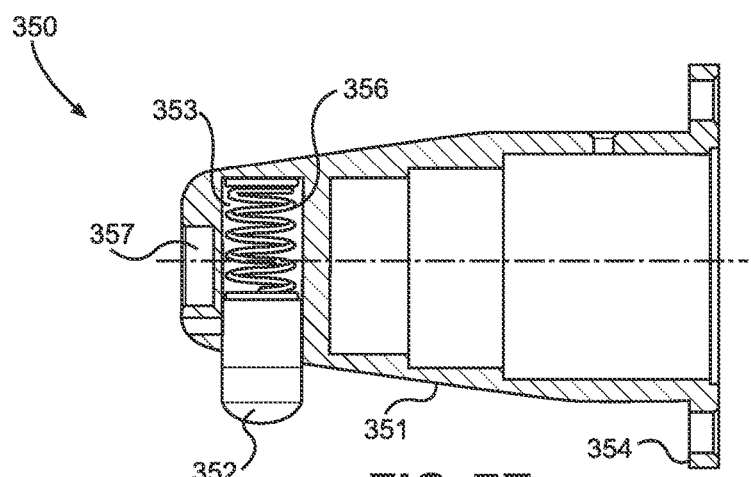
FIG. 7E illustrates in side cross-section view the robotic arm coupler of FIG. 7A according to one embodiment of the present disclosure.
Figure 7F:
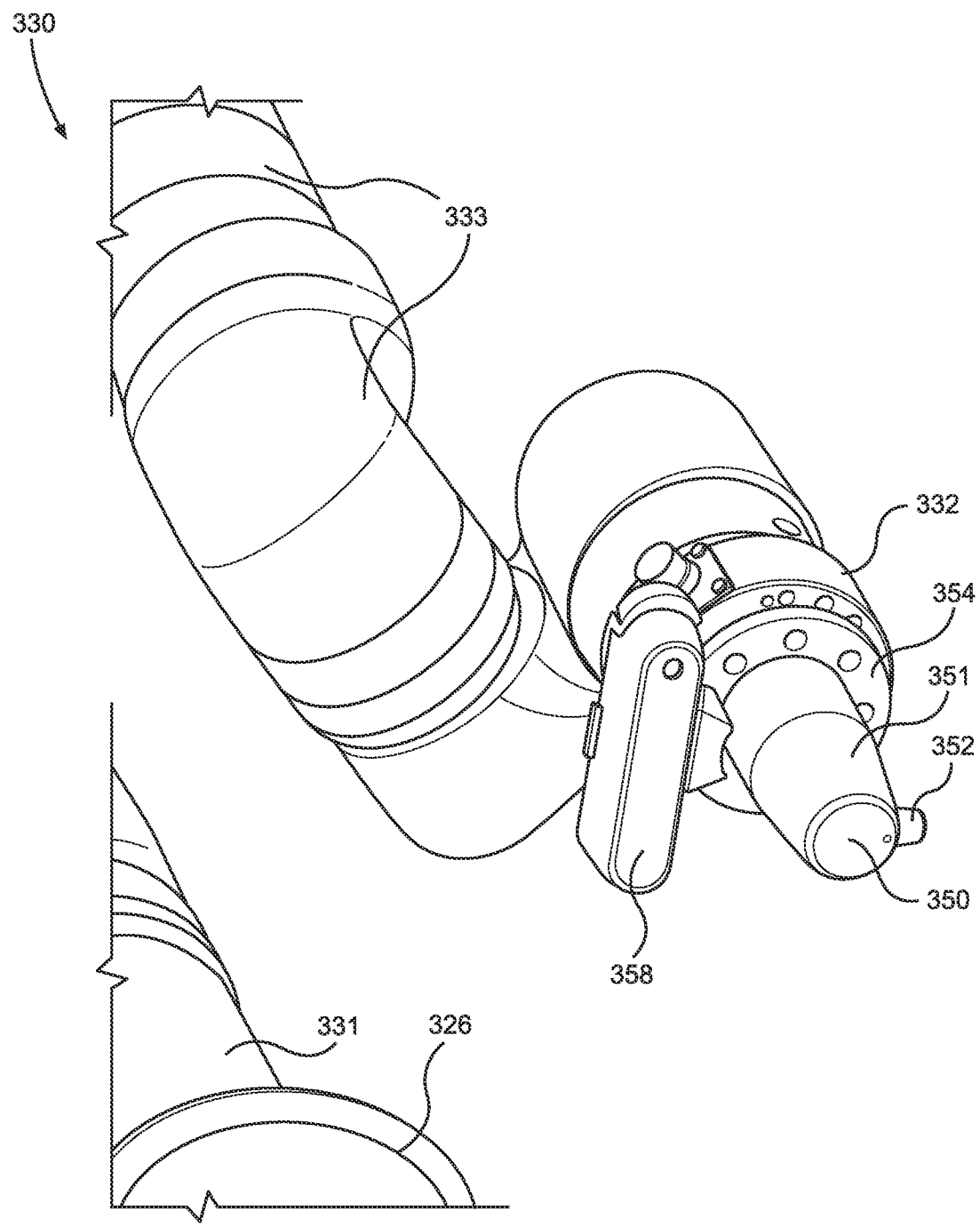
FIG. 7F illustrates in bottom perspective view an example robotic arm coupler as coupled to a robotic arm according to one embodiment of the present disclosure.

FIG. 7F illustrates in bottom perspective view an example robotic arm coupler as coupled to a robotic arm. As noted above, robotic arm coupler 350 can be fastened or coupled to movable end 332 of robotic arm 330 by way of robotic arm coupler flange 354. Again, robotic arm 330 can have multiple movable arm segments arranged in series to couple movable end 332 with fixed end 331, which in turn can be coupled to robotic arm mount 326 or any other suitable mounting portion on the overall cleaning robot. Spring-loaded pin 352 can protrude from conically shaped extending portion 351 of robotic arm coupler when no object or other force is in place to push the pin inward. Robotic arm can be configured and programmed to move its movable end 332 through multiple degrees of freedom to orient and position robotic arm coupler at many or all possible orientations, directions, and locations about the cleaning robot.

In some arrangements, camera 358 or any other suitable sensor unit or units can be mounted to robotic arm 330 at a strategic location to detect couplings, uncouplings, and other activity of robotic arm coupler 350. Camera 358 or other sensor(s) can be oriented to facilitate detecting when robotic arm coupler 350 is properly aligned with and securely coupled to a separate tool coupler, for example. This can be accomplished by sensing or detecting relative alignments between and full insertion of robotic arm coupler 350 into the separate tool coupler. An opening along the top of the separate tool coupler can facilitate detecting proper alignment and full insertion for secure coupling, as detailed below. In some arrangements, camera 358 can also be used to detect which cleaning tool is coupled to robotic arm coupler 350. This can be accomplished, for example, by putting distinguishing marks or labels on each different cleaning tool, its respective tool coupler, or both.

As will be readily appreciated, this camera 358 or other sensor(s) can sense or detect information and communicate information along to one or more processing units within the cleaning robot. Such processing unit(s) can then interpret communicated information to determine whether a secure coupling has been achieved, a recoupling procedure should be performed, or manual intervention is needed. Such processing unit(s) can also interpret cleaning tool identifier information to confirm that the proper cleaning tool is coupled to the robotic arm such that a programmed series of motions of the robotic arm and other robot activities for that particular cleaning tool are safe to perform. Other adaptations and uses of camera 358 are also possible, and this camera and various other sensors on the cleaning robot can be used to confirm that appropriate cleaning functions and other robot activities are being performed properly.

Next, FIGS. 8A through 8E illustrate an example tool coupler of a tool change module for a bathroom cleaning robot in top plan, front elevation, side elevation, bottom plan, and side cross-section views respectively. Tool coupler 360 can include an internally conically shaped receiving portion 361, a top opening 362 therethrough, a bottom opening 363 therethrough, a primary mating magnet 364, one or more secondary mating magnets 365, tool coupler flange 366 and openings 367 therethrough, among other possible items and features. Receiving portion 361 can be sized and shaped to receive the conically shaped extending portion of the robotic arm coupler. Top opening 362 can be used to visually verify a proper mating of tool coupler 360 to the robotic arm coupler. Bottom opening 363 can be sized and shaped to receive the pin of the robotic arm coupler to securely couple and lock tool coupler 360 to the robotic arm coupler.

Tool coupler flange 366 can be used to fasten or otherwise couple tool coupler 360 to a specific cleaning tool by way of openings 367, which can be used with screws, nails, bolts, rivets, or other suitable fasteners or couplers. Primary mating magnet 364 can be embedded within tool coupler flange 366 at the back center of receiving portion 361, and this primary mating magnet can be positioned to facilitate an accurate alignment between tool coupler 360 and the robotic arm coupler when the robotic arm coupler is inserted into the receiving portion. One or more secondary mating magnets 365 located along the bottom of tool coupler 360 can facilitate an accurate alignment between the tool coupler and a mounting component located on the robot when the cleaning tool and tool coupler are mounted to the mounting component.

In some arrangements, receiving portion 361 can include one or more partial sidewalls 368 and a floor 369 that slants upward from the front to the back of tool coupler 360. These and other features can facilitate smooth coupling and uncoupling of the tool coupler to the robotic arm coupler. Upon insertion of the robotic arm coupler, for example, the spring-loaded pin can be forced into its internal cavity within the robotic arm coupler as the robotic arm coupler travels along floor 369 of receiving portion 361. When the pin then arrives at bottom opening 363, its spring can force the pin to snap into the bottom opening, which then securely locks the robotic arm coupler in place within tool coupler 360. Again, primary mating magnet 364 can interact with a corresponding magnet at the front nose of the robotic arm coupler to facilitate an accurate alignment of the robotic arm coupler and tool coupler 360 during this coupling process between these components.

When tool coupler 360 is successfully coupled to the robotic arm coupler, the robotic arm can then lift the tool coupler and its associated cleaning tool off its mounted location to be used for cleaning operations. When the robotic arm goes to put the cleaning tool and its tool coupler 360 back to its mounting location, a pin or other suitable mechanism located on the mounting component at the mounting location can extend into bottom opening 363 from the bottom of the tool coupler. This pin can force the spring loaded pin of the robotic arm coupler to recede into its internal cavity so that the robotic arm coupler can then be slid out of receiving portion 361 of tool coupler 360, which successfully uncouples the robotic arm and cleaning tool.

Continuing with FIGS. 9A through 9D, an example mounting component of a tool change module for a bathroom cleaning robot in illustrated in front perspective, side cross-section, rear elevation, and bottom plan views respectively. As shown, mounting component 370 can be configured for mounting two separate tool couplers with their associated different cleaning tools. It will be readily appreciated that a given mounting component can alternatively be configured for mounting a single combined tool coupler and cleaning tool or more than two combined tool couplers and cleaning tools. Also, all mounting components can be fastened or otherwise coupled to any suitable location on or about a cleaning robot, such as atop a main body, atop a mobility module, or along the sides of either, among other possible locations.

For each separate mounting location for a tool coupler and associated cleaning tool, mounting component 370 can include a cradle 371 having sidewalls on both sides thereof, an upward protruding post 372, a front magnet 373, one or more rear magnets 374, and multiple spring loaded couplings 375, among other possible items and features. Cradle 371 can serve to physically hold and support a tool coupler mounted therein, while a respective upward protruding post 372 can insert into the opening along the bottom of the tool coupler when it is mounted within a cradle of mounting component 370 to lock the tool coupler in place when it is properly aligned and mounted to the mounting component. Front magnet 373 and one or more rear magnets 374 can facilitate guiding and properly aligning a tool coupler within a respective cradle 371 as the tool coupler is inserted into the cradle from the front. Multiple spring loaded couplings 375 can couple mounting component 370 to an outer surface of the overall cleaning robot and can also be configured to move vertically, as detailed below.

Figure 9E:
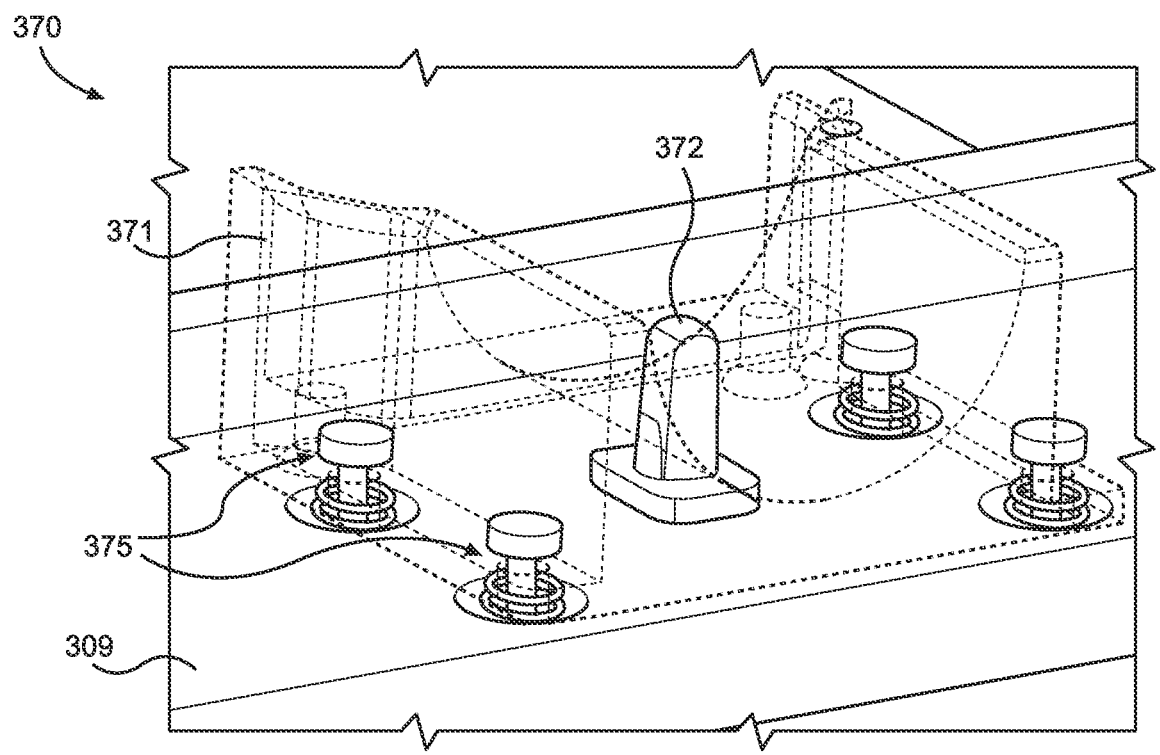
FIG. 9E illustrates in front perspective transparent view an example coupling arrangement for coupling a mounting component to an outer surface of a bathroom cleaning robot according to one embodiment of the present disclosure.
Figure 9F:
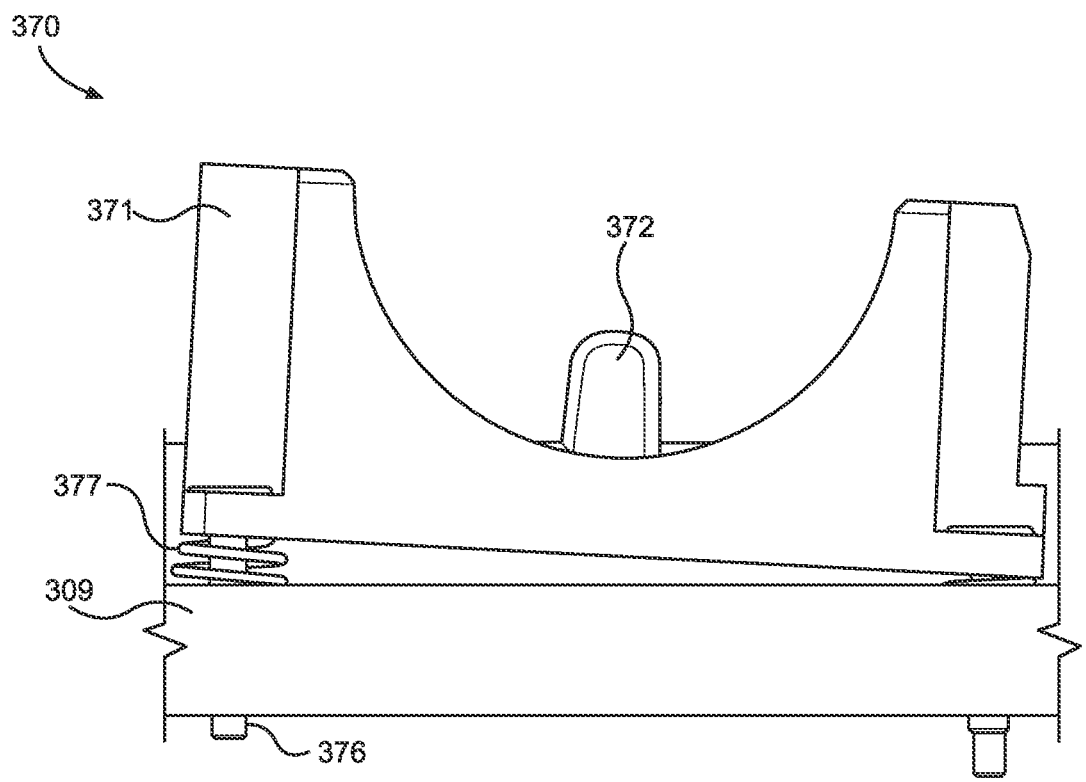
FIG. 9F illustrates in side elevation view the coupling arrangement of FIG. 9E according to one embodiment of the present disclosure.

FIGS. 9E and 9F illustrate an example coupling arrangement for coupling a mounting component to an outer surface of a bathroom cleaning robot in front perspective transparent and side elevation views respectively. Again, multiple spring loaded couplings 375 can couple mounting component 370 to an outer surface 309 of the bathroom cleaning robot or other cleaning robot. Such an outer surface can be atop or along a side of the main body, the mobility module, or at any other suitable location on the overall robot. Each spring loaded coupling 375 can include a pin 376 and a spring 377. Each pin 376 can be situated vertically through openings in outer surface 309 and in or about cradle 371 of mounting component 370, and each spring 377 can be situated around the pin between the outer surface and cradle. Pinheads, washers, and/or other suitable physical stopping features can keep pins 376 in place within the vertical openings of outer surface and 309 and cradle 371. The combination of spring loaded couplings 375 can collectively allow cradle 371 to move upward and downward vertically with respect to outer surface 309 while still remaining coupled thereto.

In some arrangements, such as that which is depicted in FIGS. 9E and 9F, upward protruding post 372 can be configured to remain stationary while cradle 371 is configured to be movable upward and downward, and also to be tiltable side to side to some degree due to the collective operation of spring loaded couplings 375. Such vertical movement of cradle 371 can facilitate the transition between upward protruding post 372 being within the bottom opening of the tool coupler and the spring loaded pin of the robotic arm coupler being within the bottom opening of the tool coupler, and vice-versa, depending upon whether the tool coupler is being mounted to or removed from overall mounting component 370.

Figure 9G:
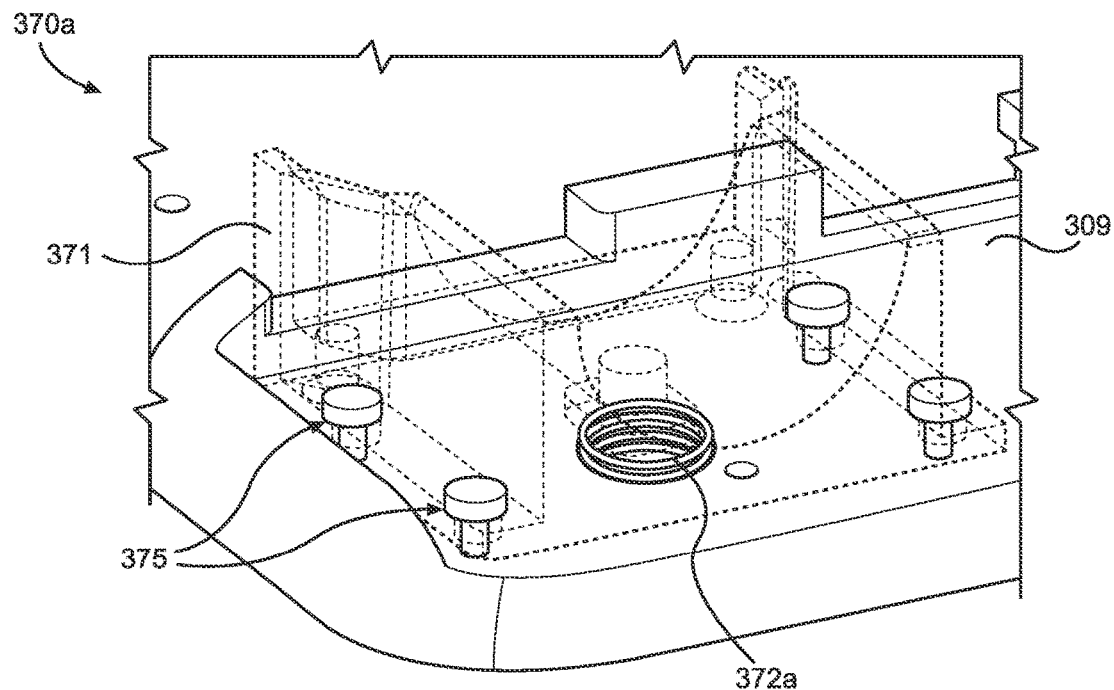
FIG. 9G illustrates in front perspective transparent view an example alternative coupling arrangement for coupling a mounting component to an outer surface of a bathroom cleaning robot according to one embodiment of the present disclosure.
Figure 9H:
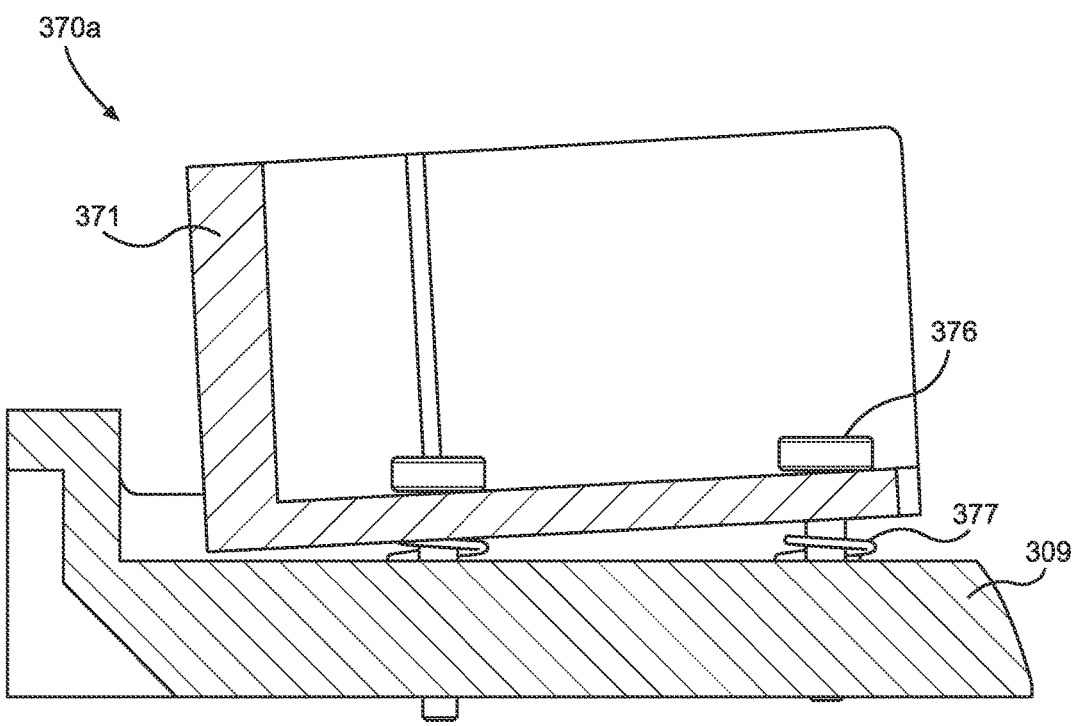
FIG. 9H illustrates in side elevation view the coupling arrangement of FIG. 9G according to one embodiment of the present disclosure.

FIGS. 9G and 9H illustrate an example alternative coupling arrangement for coupling a mounting component to an outer surface of a bathroom cleaning robot in front perspective transparent and side elevation views respectively. Mounting component 370a can be identical or substantially similar to mounting component 370 above, except for the upward protruding post and its relative arrangement within the mounting component. Again, multiple spring loaded couplings 375 having pins 376 and springs 377 can couple cradle 371 of mounting component 370a to an outer surface 309 of the bathroom cleaning robot or other cleaning robot. Rather than being fully stationary, however, alternative upward protruding post (not show) can have a spring loaded arrangement 372a that facilitates the vertical upward and downward movement of its upward protruding post. Using mounting component 370, mounting component 370a, or any other suitable mounting component arrangement, locked couplings and control of a given tool coupler by way of its bottom opening can be passed back and forth between a mounting component and the robotic arm coupler by way of the flexible movement of the cradle and/or upward protruding post. Other mechanisms to facilitate the transfer of locked couplings are also possible, and any such suitable mechanism is contemplated for use with the present disclosure.

Figure 8A:
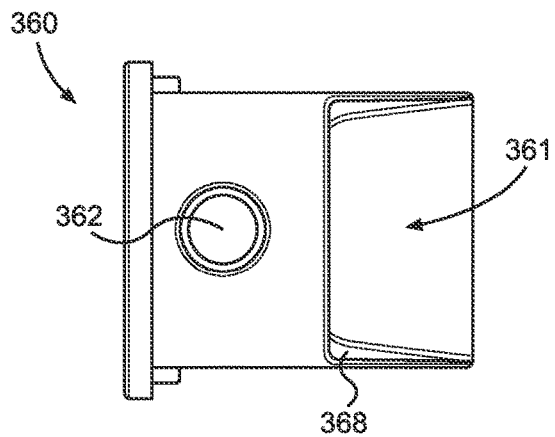
FIG. 8A illustrates in top plan view an example tool coupler of a tool change module according to one embodiment of the present disclosure.
Figure 8B:
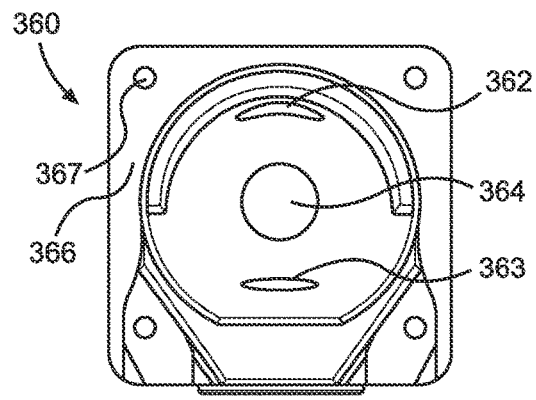
FIG. 8B illustrates in front elevation view the tool coupler of FIG. 8A according to one embodiment of the present disclosure.
Figure 8C:
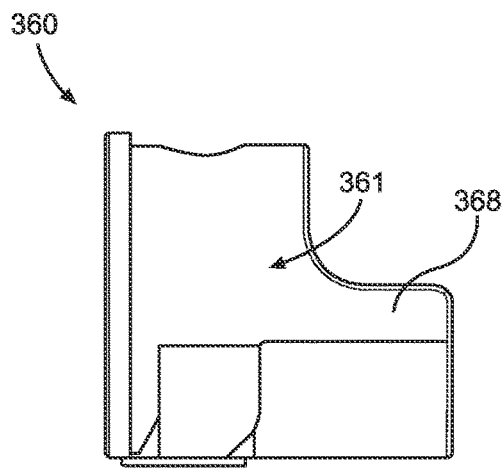
FIG. 8C illustrates in side elevation view the tool coupler of FIG. 8A according to one embodiment of the present disclosure.
Figure 8D:
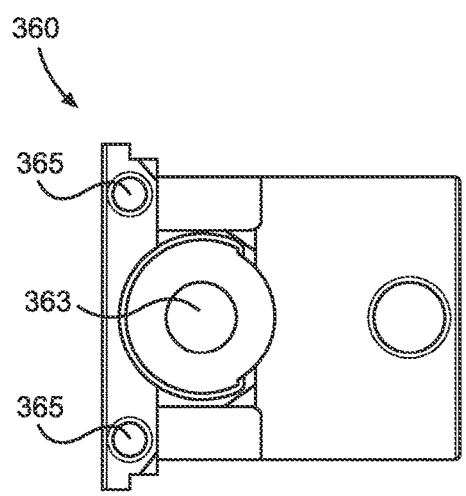
FIG. 8D illustrates in bottom plan view the tool coupler of FIG. 8A according to one embodiment of the present disclosure.
Figure 8E:
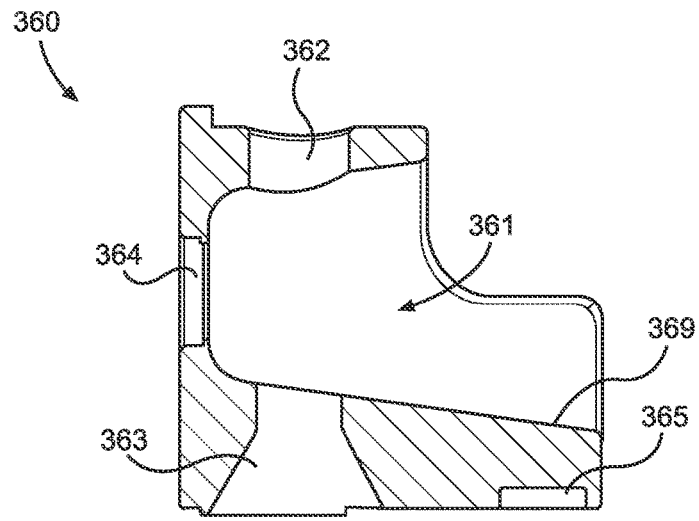
FIG. 8E illustrates in side cross-section view the tool coupler of FIG. 8A according to one embodiment of the present disclosure.
Figure 10A:
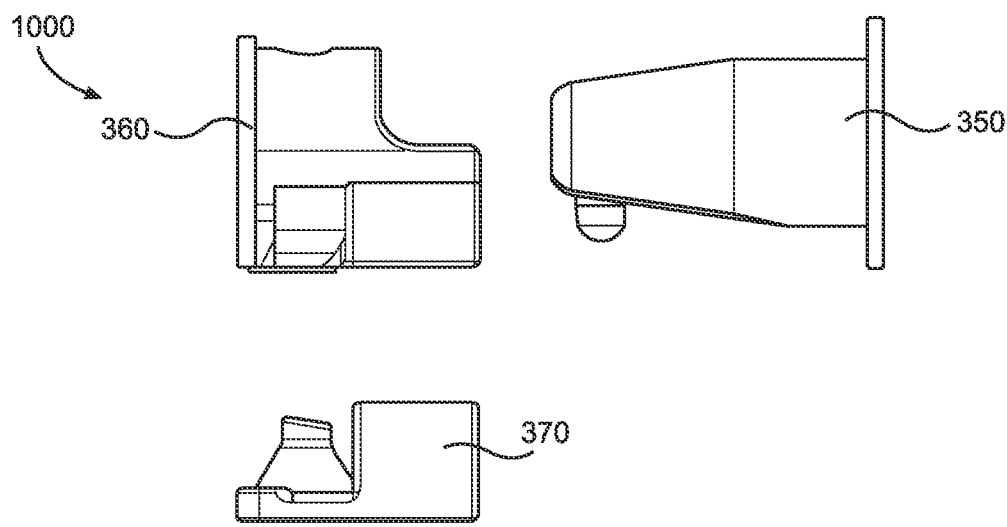
FIG. 10A illustrates in side elevation view an example uncoupled tool change module having the robotic arm coupler of FIG. 7A, the tool coupler of FIG. 8A, and the mounting component of FIG. 9A according to one embodiment of the present disclosure.
Figure 10B:
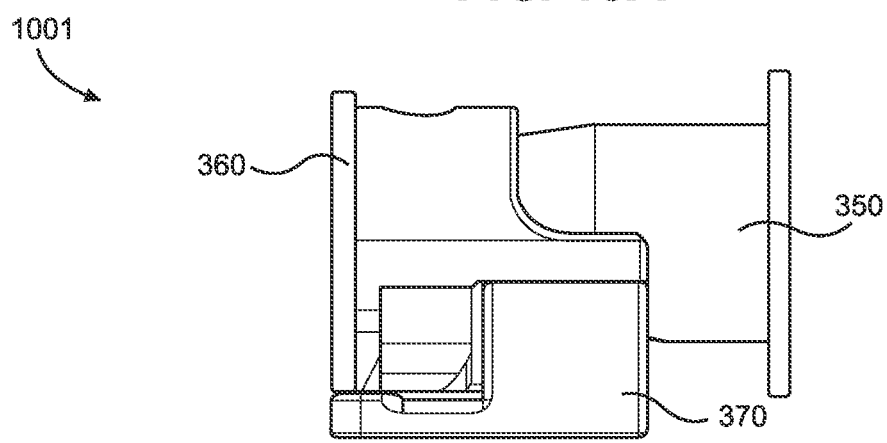
FIG. 10B illustrates in side elevation view the tool change module of FIG. 10A with its components coupled together according to one embodiment of the present disclosure.
Figure 10C:
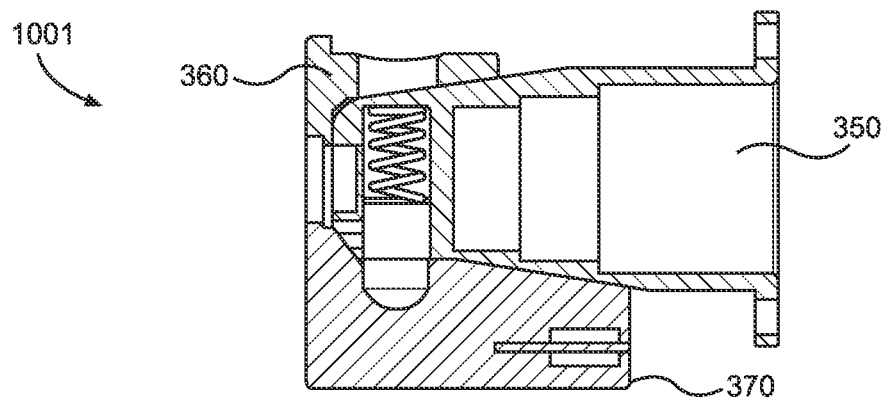
FIG. 10C illustrates in side cross-section view the tool change module of FIG. 10B with its components coupled together according to one embodiment of the present disclosure.
Figure 10D:
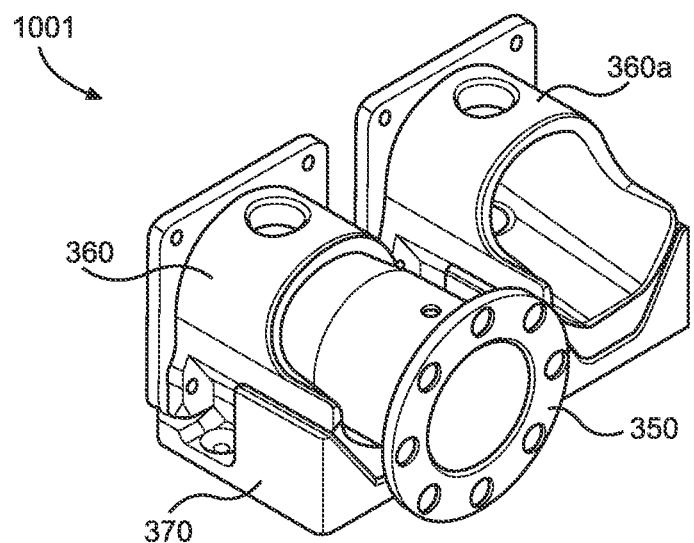
FIG. 10D illustrates in front perspective view the tool change module of FIG. 10B with its components coupled together according to one embodiment of the present disclosure.
Figure 10E:
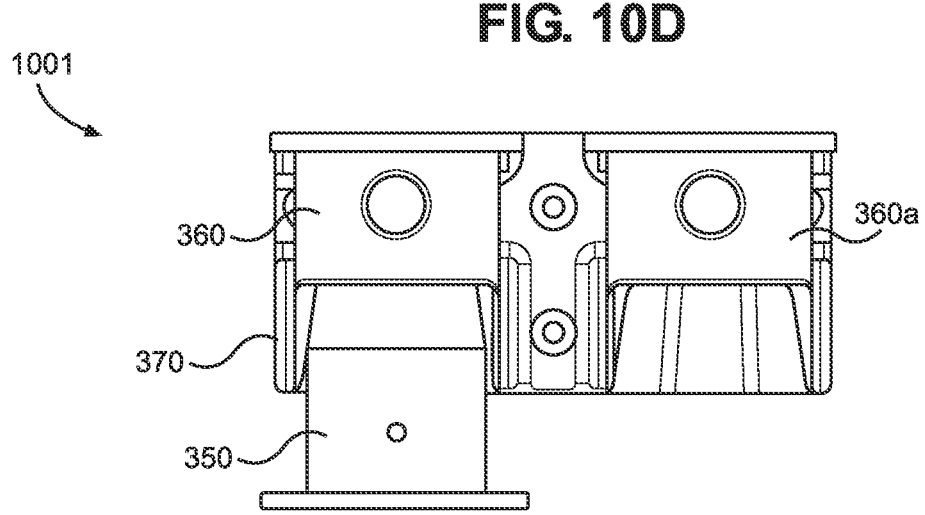
FIG. 10E illustrates in top plan view the tool change module of FIG. 10B with its components coupled together according to one embodiment of the present disclosure.
Figure 10F:
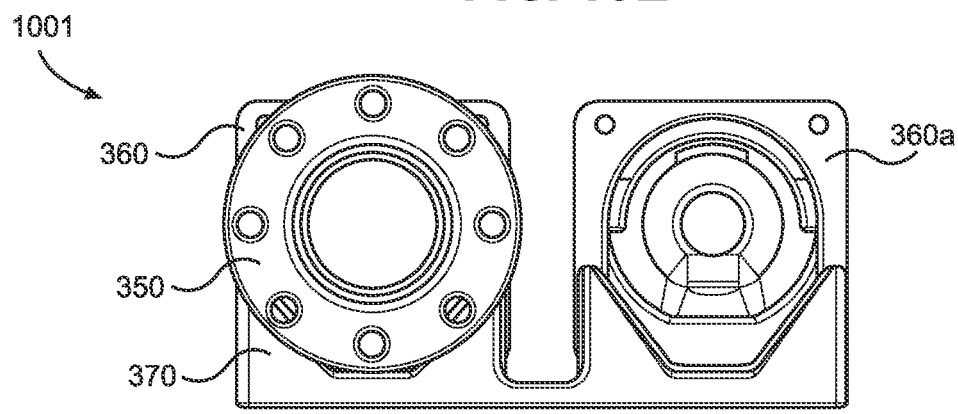
FIG. 10F illustrates in front elevation view the tool change module of FIG. 10B with its components coupled together according to one embodiment of the present disclosure.

Moving next to FIG. 10A, an example uncoupled tool change module having the robotic arm coupler of FIG. 7A, the tool coupler of FIG. 8A, and the mounting component of FIG. 9A is shown in side elevation view. Uncoupled arrangement 1000 can be identical or substantially similar to uncoupled arrangement 500 above by including three main components of a tool change module. As shown in uncoupled arrangement 1000, robotic arm coupler 350 is uncoupled from tool coupler 360 in its ordinary direction of uncoupling, while tool coupler 360 is uncoupled from mounting component 370 in its ordinary direction of uncoupling. As in the above example, these tool change module components are depicted as separate from all other bathroom cleaning robot items and components for purposes of illustration. Various details for these components set forth in FIGS. 7A through 9H are also shown for illustration purposes.

Next, FIGS. 10B through 10F illustrate the tool change module of FIG. 10A with its three main components coupled together in side elevation, side cross-section, front perspective, top plan, and front elevation views respectively. Coupled arrangement 1001 can be substantially similar to coupled arrangement 501 above with robotic arm coupler 350, tool coupler 360, and mounting component 370 all being coupled together. Again, various details for these components set forth in FIGS. 7A through 9H are shown and multiple views are provided for illustration purposes to depict how these components can appear when they are all coupled together. As reflected in FIGS. 10D-10E in particular, mounting component 370 can be a double mounting component that is configured to mount and host two separate tool couplers 360 and 360a, with robotic arm coupler 350 being immediately coupled to tool coupler 360 only and the second tool coupler 360a being mounted to a separate cradle of mounting component 370 and ready for coupling to the robotic arm coupler at a later time.

As will be readily appreciated from the foregoing drawings and description, all three of robotic arm coupler 350, tool coupler 360, and mounting component 370 being coupled together at the same time can typically reflect a tool change in process. In ordinary use, tool coupler 360 will typically be coupled to robotic arm coupler 350 or to its respective mounting component 370, with the third component being uncoupled from the two that are coupled.

Door Opening Module

As noted above, the disclosed bathroom cleaning robot and other cleaning and autonomously functioning robots can include a door opening module that can be configured to open a spring-loaded hinged door and hold the door open while the overall robot moves itself through the open door. In some arrangements, the door opening module can include components configured to actuate a door handle or doorknob and at least begin to open the door. These can include, for example, a hooking tool coupled to a robotic arm such that the robotic arm can use the hooking tool to actuate a standard elongated door handle for a commercial public bathroom, as well as to begin pushing or pulling the door open. Operation of such a hooking tool for this purpose will be readily understood with reference to the foregoing figures and details regarding the robotic arm, tool change module, and cleaning tools, of which the hooking tool can be a part. More particularly, the door opening module can include an extendable foot arrangement that is configured to hold open a pulled open spring-loaded door to allow the entire robot to move through the open door without the door closing on the robot during the process.

Figure 11A:
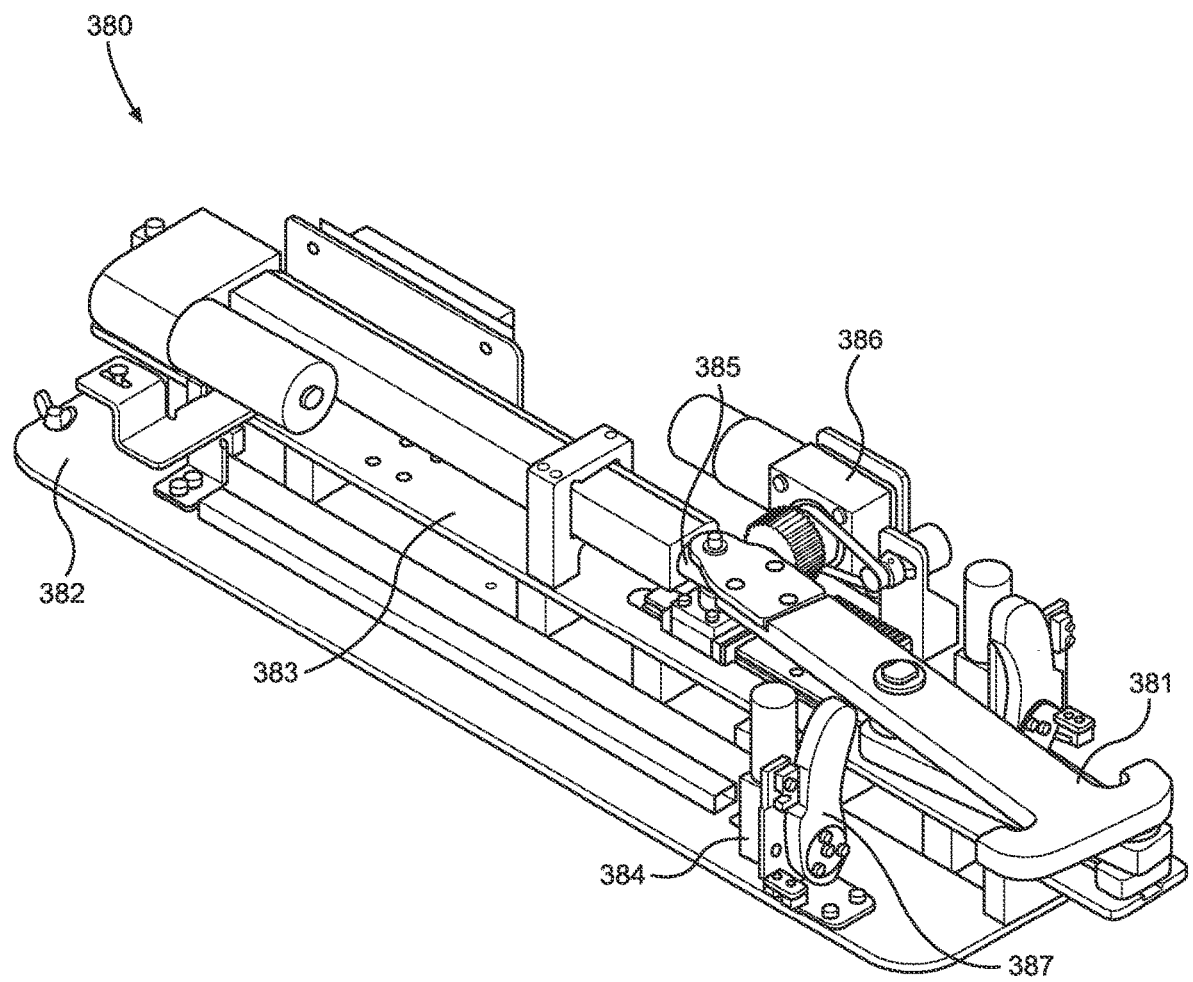
FIG. 11A illustrates in front perspective view an example door opening module of a bathroom cleaning robot in a foot retracted configuration according to one embodiment of the present disclosure.

Transitioning now to FIG. 11A, an example door opening module of a bathroom cleaning robot is shown in a foot retracted configuration in front perspective view. Door opening module 380 can include an extendable foot arrangement 381 and various associated components, parts, and features. While a robotic arm and coupled hooking tool can be included with and considered as part of an overall door opening module, focus here will only be on the extendable foot arrangement of a door opening module for purposes of illustration and discussion. Further, while the example embodiment detailed herein provides that door opening module 380 and its extendable foot arrangement 381 and associated components and parts can be located within and extend from a mobility module, it is also contemplated that this module and these associated items can alternatively be located at and can extend from elsewhere on the overall robot.

Extendable foot arrangement 381 can be configured to automatically extend from the bathroom cleaning robot, pivot behind a spring-loaded door while it is extended and the spring-loaded door is open, contact a surface of the spring-loaded door on the other side the bathroom cleaning robot, and hold open the spring-loaded door while a mobility module of the bathroom cleaning robot moves the bathroom cleaning robot autonomously through the open spring-loaded door. Again, extendable foot arrangement 381 can be located within a mobility module of a bathroom cleaning robot, although other suitable locations are also possible. For example, extendable foot arrangement 381 can retract to the position shown in FIG. 11A to be fully or mostly within a mobility module while not in use and can then extend laterally outward from the front of the mobility module and overall cleaning robot when in use as the robot faces a door.

Door opening module 380 can generally include extendable foot arrangement 381, base plate 382, sliding assembly 383, sliding assembly motor 384, sliding bar 385, sliding bar motor 386, and one or more physical stops 387, among other components and features. Base plate 382 can be mounted to or affixed at a permanent stationary position within the mobility module and can provide a chassis to which all of the other depicted components are directly or indirectly mounted or coupled. Sliding assembly 383 and various components mounted thereto can slide forward and away from stationary base plate 382 as a combined unit to extend the entire extendable foot arrangement 381 outward from the mobility module. Sliding assembly motor 384 can drive sliding assembly 383 to extend it outward and retract it backward using any of a number of suitable drive mechanisms. Sliding bar 385 can provide a secondary form of relative extension and retraction for different parts of extendable foot arrangement 381, as detailed below. Sliding bar motor 386 can drive sliding bar 385 to extend it outward and retract it backward using any of a number of suitable drive mechanisms. One or more physical stops 387 can provide physical limits to the amount of extension available for the various extending and moving components of door opening module 380.

Figure 11B:
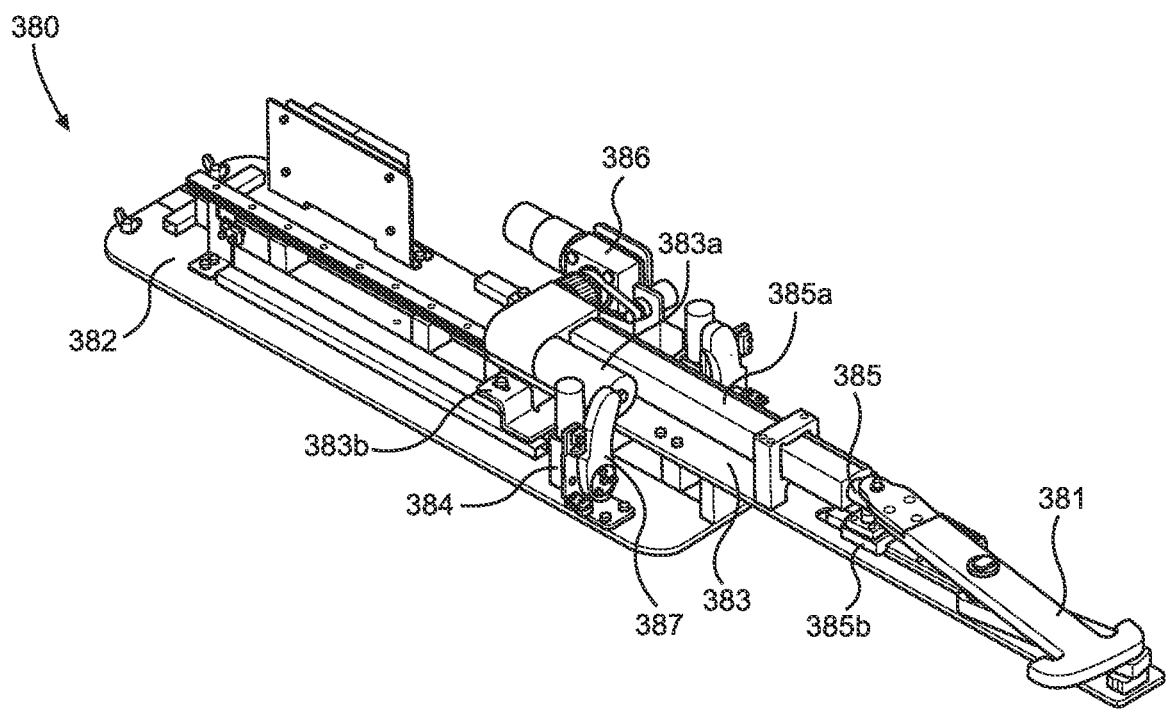
FIG. 11B illustrates in front perspective view the door opening module of FIG. 11A in a foot extended configuration according to one embodiment of the present disclosure.

FIG. 11B illustrates in front perspective view the door opening module of FIG. 11A in a foot extended configuration. As shown, sliding assembly 383 and all components mounted thereto have been extended forward as a combined unit until protrusion 383a on the sliding assembly physically contacts the stationary physical stop 387 mounted to base plate 382 to prevent further forward movement. Sliding assembly motor 384 can drive this forward movement of sliding assembly 383, such as by way of a robotically controlled servo motor driving a coupled chain along a track (not shown) that pulls and pushes a bracket 383b coupled to the sliding assembly, for example, among other possible mechanical drive mechanisms. Various components of extendable foot arrangement 381 can remain in a relatively aligned elongated position as shown during movement of sliding assembly 383.

Figure 11C:
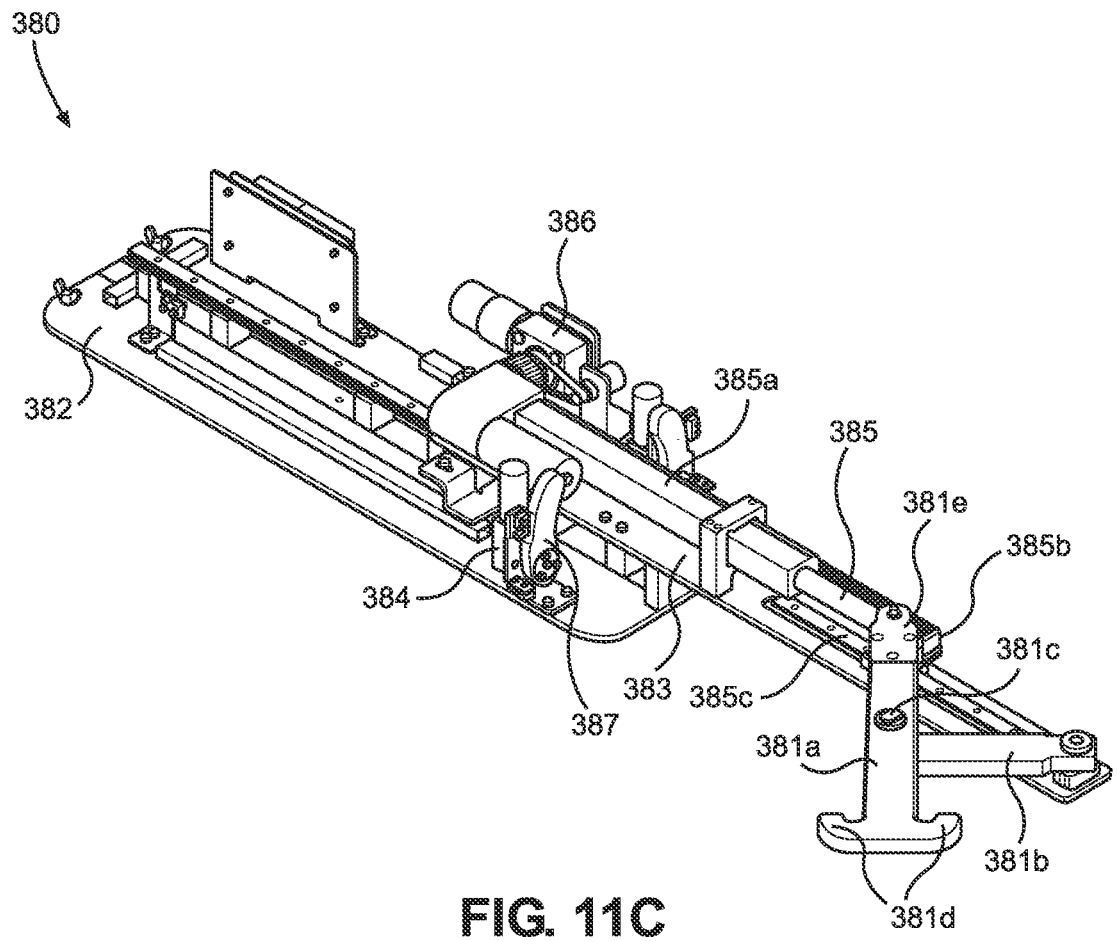
FIG. 11C illustrates in front perspective view the door opening module of FIG. 11B in a foot pivoting configuration according to one embodiment of the present disclosure.

FIG. 11C shows in front perspective view the door opening module of FIG. 11B in a foot pivoting configuration. After sliding assembly 383 has moved sufficiently or fully forward as shown, sliding bar 385 can be actuated to extend from within sliding bar sleeve 385a that remains atop and moves with the sliding mechanism. This can result in relative movement between different components of extendable foot arrangement 381 to result in a pivoting action of the forward positioned foot. For example, the extendable foot arrangement can include top foot component 381a that is pivotally coupled to bottom foot component 381b by way of pivoting pin arrangement 381c. In some arrangements, a front portion of sliding bar 385 can be coupled to sliding guide 385b that is forced to slide along a stationary track 385c mounted atop sliding assembly 383, which arrangement can provide lateral stability to the sliding bar and force it to move in forward and backward directions only with little to no side to side wobble.

Door contacts 381d can extend laterally sideways from both sides of the front of top foot component 381a such that one of these door contacts 381d can be positioned to contact the back side of an open or partially open door while the rest of the robot remains on the other side of the door. The door contact 381d that contacts and holds the door open will depend on the orientation of the door and which way top foot component 381a pivots, as will be readily appreciated. Foot coupler 381e can couple top foot component 381a to sliding bar 385 such that forward motion of the sliding bar results in the pivoting interaction between the top foot component and bottom foot component 381b, which can be rotationally coupled to the front of sliding assembly 383 as shown. In various embodiments, top foot component 381a can be configured to pivot to its left or to its right depending on the orientation of the door being opened and held open.

Figure 11D:
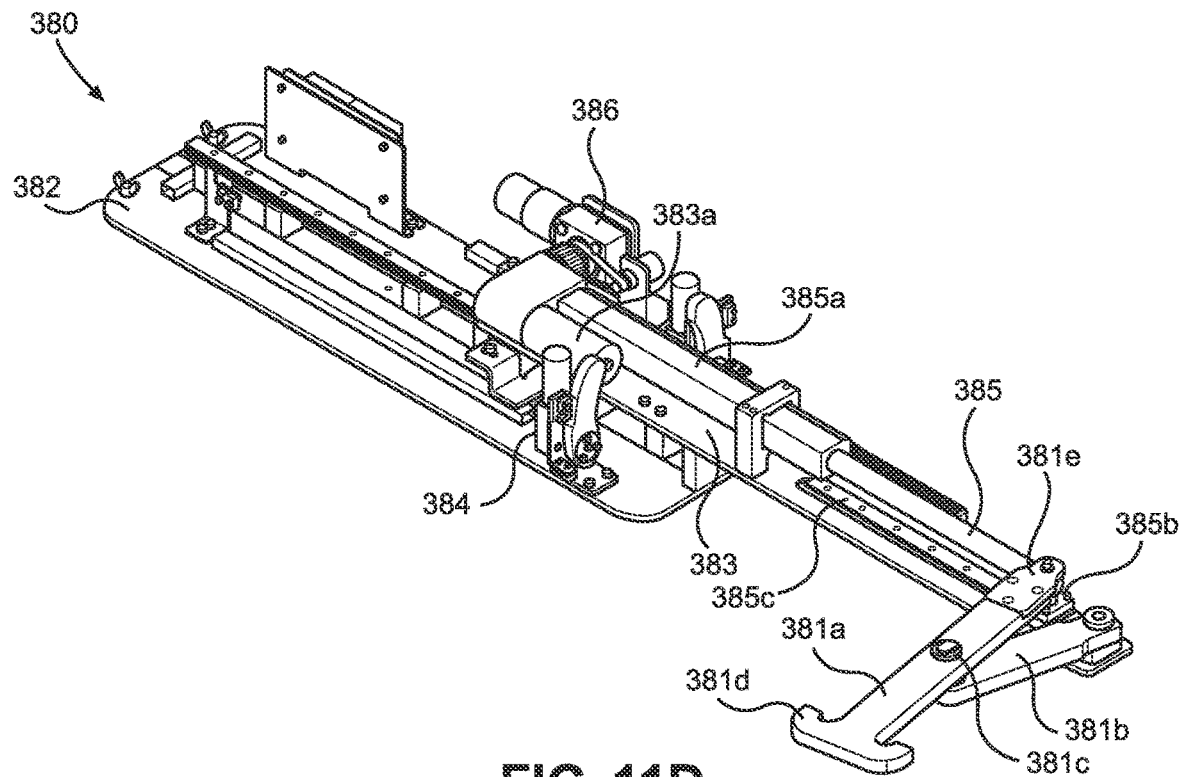
FIG. 11D illustrates in front perspective view the door opening module of FIG. 11C in a fully extended and fully pivoted foot configuration according to one embodiment of the present disclosure.

Continuing with FIG. 11D, the door opening module of FIG. 11C is shown in a fully extended and fully pivoted foot configuration, also in front perspective view. While FIG. 11C shows sliding bar 385 as extending forward and the extendable foot arrangement in the process of pivoting, FIG. 11D depicts a fully extended sliding bar and a fully pivoted extendable foot arrangement with top foot component 381a being pivoted to a fully or almost fully sideways orientation and one of door contacts 381d being positioned to hook behind or otherwise contact the back side of an opened door. In some arrangements, one or more physical stops can prevent further forward movement of sliding bar 385, such as that which may be located at a front end of stationary track 385c.

Figure 11E:
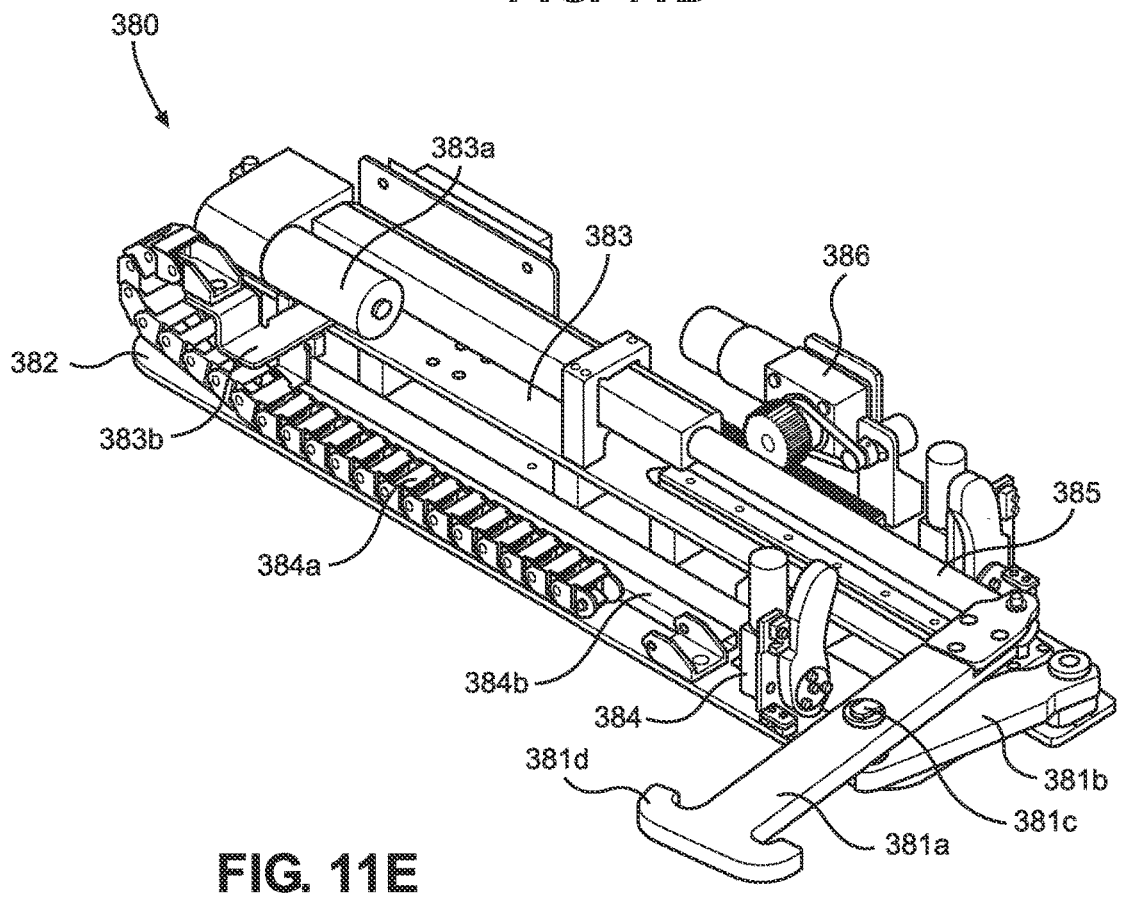
FIG. 11E illustrates in front perspective view the door opening module of FIG. 11D in a fully pivoted and retracted foot configuration according to one embodiment of the present disclosure.

Lastly, FIG. 11E illustrates in front perspective view the door opening module of FIG. 11D in a fully pivoted and retracted foot configuration. Although not always necessary, it may be favorable in some situations for sliding assembly 383 to be retracted partially or all of the way backwards to bring door contact 381d into solid contact with a subject door while the extendable foot arrangement is still fully pivoted to one side. This can be accomplished by operating sliding assembly motor 384 in a reverse direction while sliding bar 385 remains fully or at least partially extended. As noted above, operating sliding assembly motor 384 can result in a coupled chain 384a being pulled along a track 384b such that it pulls bracket 383b coupled to sliding assembly 383 to retract the sliding assembly, for example, among other possible mechanical drive mechanisms. In various arrangements, sliding assembly 383, sliding bar 385, or both can be adjusted to positions that are in between fully extended and fully retracted so as to account for the particular geometries and arrangements of a given door.

Figure 12A:
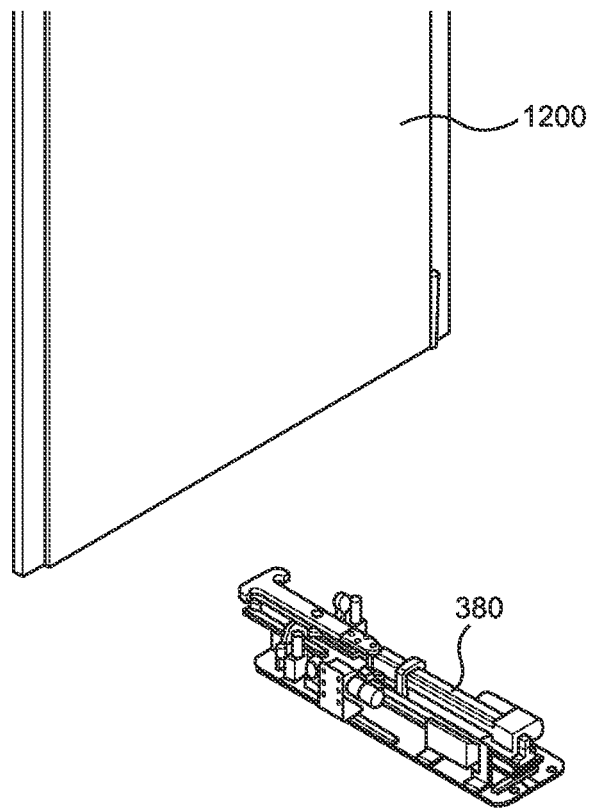
FIG. 12A illustrates in rear perspective view an example door opening module of a bathroom cleaning robot outside of a closed spring-loaded hinged door according to one embodiment of the present disclosure.
Figure 12B:
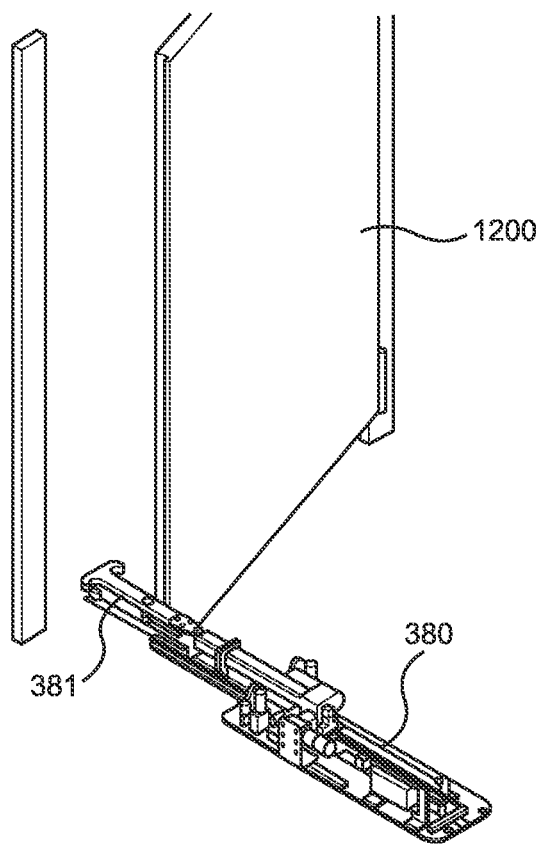
FIG. 12B illustrates in rear perspective view the door opening module of FIG. 12A with its extendable foot arrangement being extended past the opened spring-loaded hinged door according to one embodiment of the present disclosure.

Moving next to FIGS. 12A and 12B, an example door opening module of a bathroom cleaning robot is illustrated in rear perspective views relative to a spring-loaded hinged door of interest. FIG. 12A depicts the position and orientation of door opening module 380 as it approaches closed door 1200. Although door opening module 380 is shown in isolation for purposes of illustration, it will be understood that the rest of an overall bathroom cleaning robot can also be present and that the door opening module is at its ordinary location, such as within a mobility module of the bathroom cleaning robot. While door 1200 is closed and door opening module 380 is fully retracted as shown in FIG. 12A, a hooking tool (not shown) coupled to a robotic arm (not shown) of the robot can be manipulated automatically by the robot to actuate the door handle and partially pull open the door. As noted above, door 1200 can be a spring-loaded hinged door that will customarily shut on its own if it is not held open. As such, it can difficult or impossible for the robot to move itself through this kind of door using only a hooking tool and robotic arm since the door can shut itself too quickly as the robot tries to move itself through.

Accordingly, the extendable foot arrangement of door opening module 380 can be operated automatically for the purpose of holding open this kind of door after it has been pulled open such that the entire robot can move itself through the held open door. FIG. 12B depicts the position and orientation of door opening module 380 after door 1200 has been partially opened, which again can be accomplished by a hooking tool and robotic arm operation. As shown, most of door opening module 380 (and the rest of the bathroom cleaning robot) can remain in the same position as when the door was closed, except that extendable foot arrangement 381 can be extended past the now partially opened door 1200.

Figure 13A:
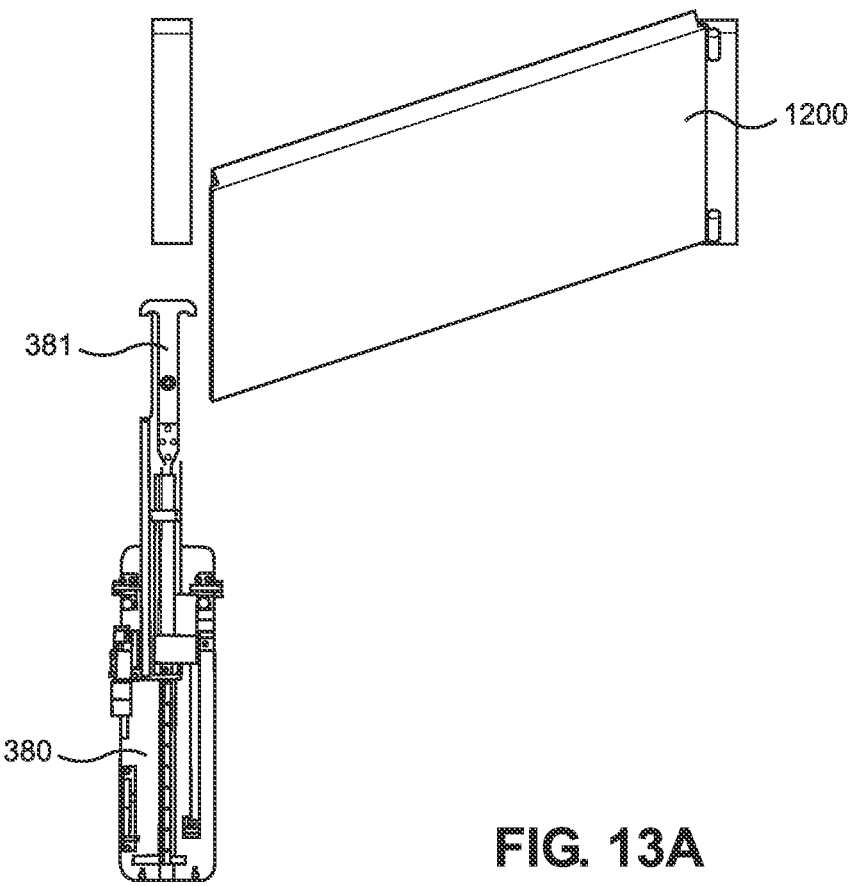
FIG. 13A illustrates in top plan view the door opening module of FIG. 12B with its extendable foot arrangement being extended past the opened spring-loaded hinged door according to one embodiment of the present disclosure.
Figure 13B:
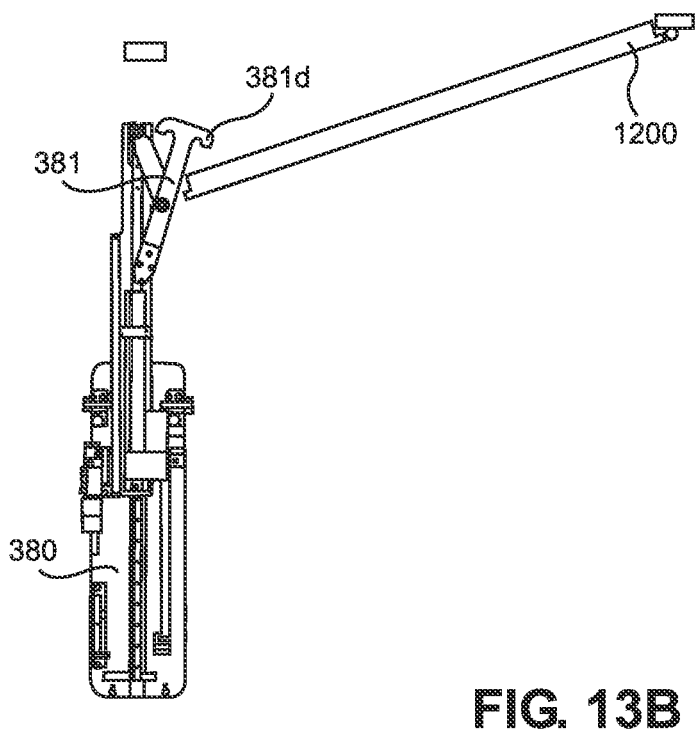
FIG. 13B illustrates in top plan view the door opening module of FIG. 13A with its extendable foot arrangement starting to pivot behind the opened spring-loaded hinged door according to one embodiment of the present disclosure.

Continuing with FIGS. 13A through 13F, a series of top plan views illustrate an example process of how the door opening module continues to operate from the position shown in FIG. 12B. Starting with FIG. 13A, door opening module 380 is shown with its extendable foot arrangement 381 being extended past opened spring-loaded hinged door 1200, with this being the same configuration and process stage as shown in FIG. 12B only from a different perspective. FIG. 13B illustrates in top plan view door opening module 380 with its extendable foot arrangement 381 starting to pivot behind opened spring-loaded hinged door 1200 such that door contact 381d is starting to angle toward and move across the back side of the door.

Figure 13C:
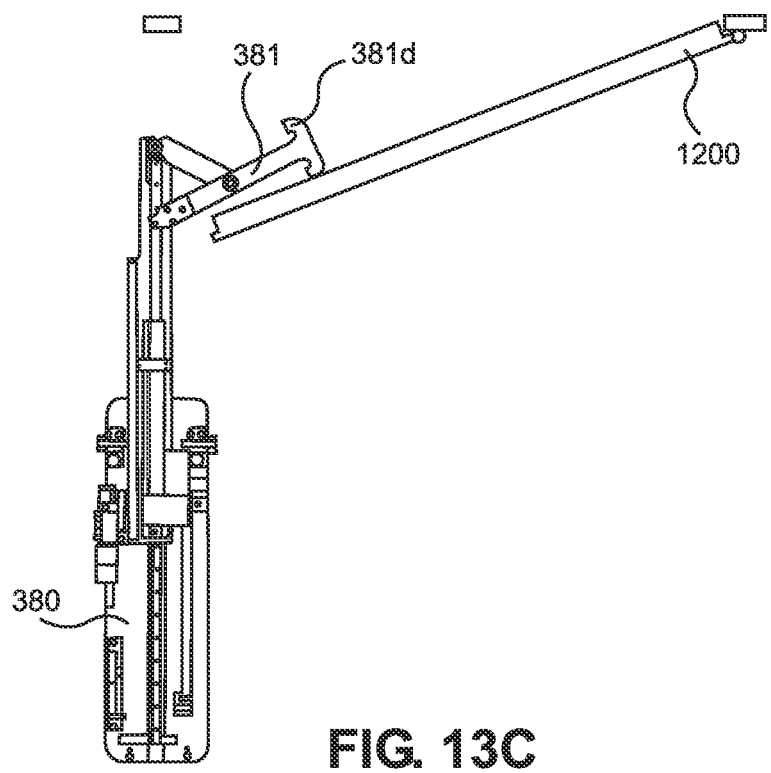
FIG. 13C illustrates in top plan view the door opening module of FIG. 13B with its extendable foot arrangement continuing to pivot behind the opened spring-loaded hinged door according to one embodiment of the present disclosure.

Next, FIG. 13C illustrates in top plan view door opening module 380 with its extendable foot arrangement 381 still pivoting behind opened spring-loaded hinged door 1200. The amount of pivoting can be enough such that door contact 381d begins to contact the back side of the door, such as along a far lateral edge of the door contact. In some cases, this door contact 381d and portions of extendable foot arrangement 381 adjacent thereto can be configured to slide along the back side of the door as the extendable foot arrangement continues to pivot.

Figure 13D:
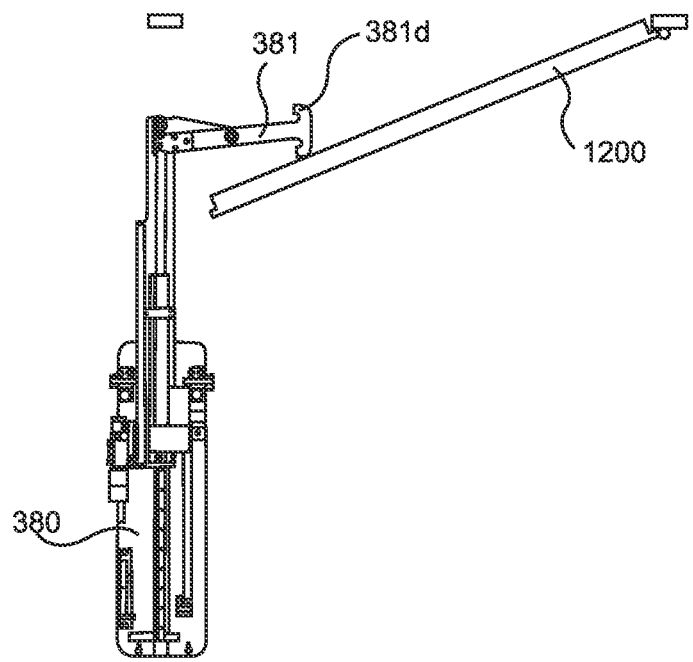
FIG. 13D illustrates in top plan view the door opening module of FIG. 13C with its extendable foot arrangement being fully pivoted behind and pulling against the back side of the opened spring-loaded hinged door according to one embodiment of the present disclosure.

FIG. 13D illustrates in top plan view door opening module 380 with its extendable foot arrangement 381 being fully pivoted behind and pulling against the back side of opened spring-loaded hinged door 1200. As can be seen in this series of figures, the geometry of door contact 381d can be rounded such that the actual point of contact between this feature and door 1200 can shift along door contact 381d as the overall extendable foot arrangement pivots, extends, and otherwise moves relative to door 1200. Such a geometry can also result in there being no scratches, marks, or other damage to the door due to any shifting or sliding.

Figure 13E:
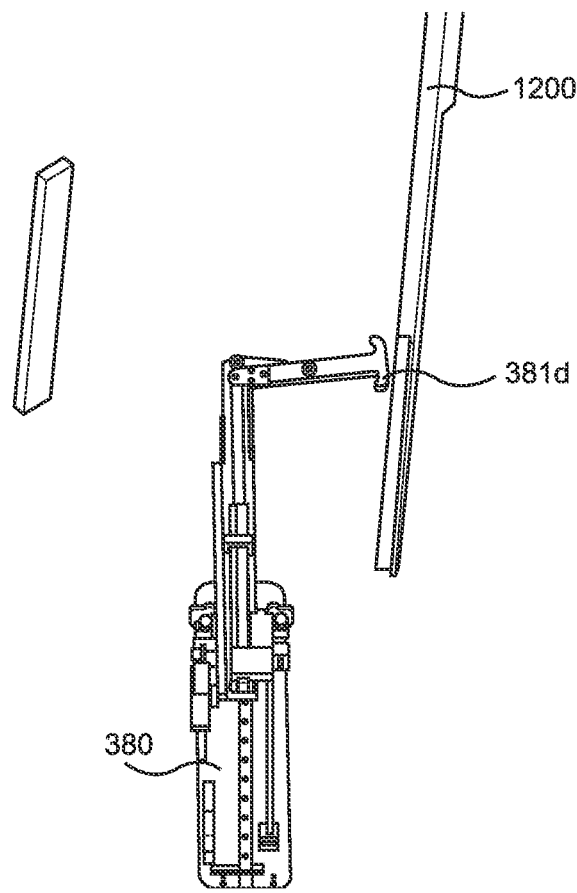
FIG. 13E illustrates in top plan view the door opening module of FIG. 13D with its extendable foot arrangement being fully pivoted behind and forcing open further the opened spring-loaded hinged door according to one embodiment of the present disclosure.

FIG. 13E illustrates in top plan view door opening module 380 with its extendable foot arrangement 381 being fully pivoted behind and forcing open further the opened spring-loaded hinged door 1200. At this configuration and process stage, the position and orientation of the overall bathroom cleaning robot (and thus door opening module 380 situated therewithin) can be moved and shifted as extendable foot arrangement 381 continues to force open door 1200 further as the overall robot also prepares to move past the open door. Again, door contact 381d can be rotated even further than in the previous process stage such that the entire front surface of the top foot component of extendable foot arrangement 381 is contacting and exerting force against the back side of open door 1200.

Figure 13F:
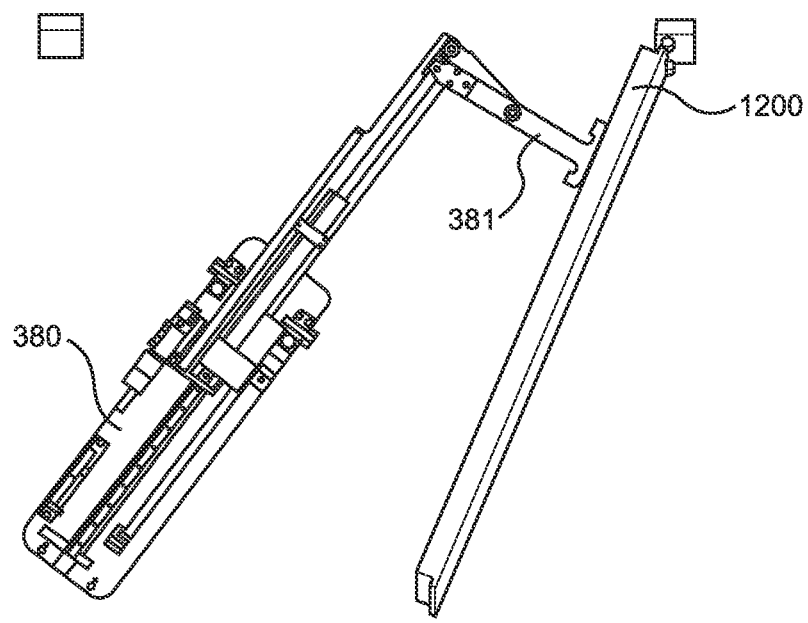
FIG. 13F illustrates in top plan view the door opening module of FIG. 13E passing through the opened spring-loaded hinged door as its extendable foot arrangement holds the door open according to one embodiment of the present disclosure.

FIG. 13F illustrates in top plan view door opening module 380 passing through the opened spring-loaded hinged door 1200 as its extendable foot arrangement 381 holds the door open. Of course, this representation also means that the entire bathroom cleaning robot is passing through opened door 1200, as door opening module remains within the cleaning robot itself, such as within a mobility module of the cleaning robot. During this stage of the process, extendable foot arrangement 381 can be manipulated to exert sufficient force against the back side of open door 1200, and this can be accomplished by way of gross and/or fine-tuned frontward and/or backward movements of one or both of the sliding bar and the sliding assembly of door opening module 380, as detailed above.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A bathroom cleaning robot, comprising:
   a main body having a main outer housing containing a plurality of internal components configured to facilitate the autonomous cleaning of a bathroom;
   a mobility module coupled to the main body and configured to move the bathroom cleaning robot autonomously across a floor within the bathroom;

a robotic arm having a fixed end coupled to the main body or the mobility module, a movable end configured to move through multiple degrees of freedom relative to the fixed end, and multiple movable arm segments between the fixed end and the movable end, wherein the robotic arm is configured to facilitate the autonomous cleaning of the bathroom;

a plurality of different cleaning tools removably mounted to respective mounting locations along one or more outer surfaces of the main body, the mobility module, or both, wherein each of the plurality of different cleaning tools is configured to be removed from its respective mounting location and to be manipulated by the robotic arm to perform a cleaning function within the bathroom;

a tool change module configured to facilitate securely coupling and uncoupling the robotic arm to each of the plurality of different cleaning tools; and a door opening module configured to pull open and hold open a spring-loaded door autonomously while the mobility module moves the robotic cleaning device autonomously through the open spring-loaded door between a region outside of the bathroom and the bathroom, wherein the door opening module includes an extendable foot arrangement configured to automatically extend from the bathroom cleaning robot, pivot behind the spring-loaded door while the spring-loaded door is open, contact a surface of the spring-loaded door on the other side the bathroom cleaning robot, and hold open the spring-loaded door while the mobility module moves the robot autonomously through the open spring-loaded door.

2. The bathroom cleaning robot of claim 1, wherein the plurality of internal components within the main body include a fresh water tank configured to hold fresh water, a fresh water pump configured to pump water from the fresh water tank, at least one chemical tank configured to hold one or more cleaning chemicals, a mixer configured to mix the one or more cleaning chemicals with fresh water, a dirty water tank configured to hold dirty water, a vacuum configured to suck dirty water into the dirty water tank, a blower configured to generate an external airflow, and an electronics region including one or more processing components configured to control autonomous functions of the bathroom cleaning robot.

3. The bathroom cleaning robot of claim 1, further comprising:
a plurality of ports located along one or more outer surfaces of the main body, the mobility module, or both, wherein the plurality of ports includes a dirty water intake port, an electrical port, a cleaning fluid intake port, a clean water intake port, a dirty water discharge port, a vacuum port, and a blower port.

4. The bathroom cleaning robot of claim 1, wherein the mobility module includes a plurality of wheels, a separate motor for each wheel and configured to drive its respective wheel forward and backward independently, a suspension, one or more batteries configured to power each of the separate motors, and one or more sensors configured to detect the location of the mobility module with respect to separate items within the bathroom.

5. The bathroom cleaning robot of claim 1, wherein at least one of the plurality of different cleaning tools includes a cleaning end effector, a first rigid segment, a second rigid segment, and a flexible coupling component between the first rigid segment and second rigid segment.

6. The bathroom cleaning robot of claim 1, wherein the plurality of different cleaning tools includes at least a vacuum tool, a squeegee tool, a gripping tool, a spraying tool, a blowing tool, and a hooking tool.

7. The bathroom cleaning robot of claim 1, further comprising:
a floor vacuum module coupled to the mobility module and configured to vacuum autonomously a floor within the bathroom.

8. The bathroom cleaning robot of claim 1, wherein the tool change module includes a robotic arm coupler on the movable end of the robotic arm and a separate tool coupler on each of the plurality of different cleaning tools, each separate tool coupler being configured to removably couple with the robotic arm coupler.

9. The bathroom cleaning robot of claim 8, further comprising:
a camera coupled to the robotic arm proximate the robotic arm coupler, wherein the camera is configured to confirm a location of the robotic arm coupler and to confirm a proper coupling of the robotic arm coupler to a separate tool coupler on one of the plurality of different cleaning tools.

10. The bathroom cleaning robot of claim 8, wherein the robotic arm is configured to move its movable end through multiple degrees of freedom to facilitate removably coupling the robotic arm coupler to the tool coupler on each of the plurality of different cleaning tools while each of the plurality of different cleaning tools is mounted at its respective mounting location, to unmount and remove each of the plurality of different cleaning tools from its respective mounting location while removably coupled to the robotic arm coupler, to manipulate each of the plurality of different cleaning tools to perform a cleaning function within the bathroom, to remount each of the plurality of different cleaning tools to its respective mounting location, and to uncouple the robotic arm coupler from the tool coupler on each of the plurality of different cleaning tools while the respective cleaning tool is remounted to its respective mounting location.

11. The bathroom cleaning robot of claim 8, wherein the robotic arm coupler includes a conically shaped extending portion and each separate tool coupler includes an internally conically shaped receiving portion configured to mate with the extending portion, the extending portion including a spring-loaded locking component that protrudes through an opening in each of the receiving portions.

12. The bathroom cleaning robot of claim 8, wherein the tool change module further includes a mounting component at each mounting location, wherein each mounting component is configured to removably mount one or more of the plurality of different cleaning tools thereto.

13. The bathroom cleaning robot of claim 1, wherein the extendable foot arrangement is located within the mobility module, and wherein the robotic arm is configured to actuate a door lever or doorknob of the spring-loaded door and pull open the spring-loaded door.

14. The bathroom cleaning robot of claim 1, wherein the extendable foot arrangement includes a top foot component that is pivotably coupled to a bottom foot component such that the top foot component is configured to pivot behind the open spring-loaded door.

15. The bathroom cleaning robot of claim 14, wherein the top foot component includes a door contact that extends sideways from the front of the top foot component such that the door contact is configured to contact the surface of the spring-loaded door on the other side the bathroom cleaning robot.

16. The bathroom cleaning robot of claim 14, wherein the door opening module includes a sliding assembly configured to extend the extendable foot arrangement outward from the bathroom cleaning robot and a sliding bar configured to pivot the top foot component relative to the bottom foot component.

17. A robot configured to clean an indoor region autonomously, the robot comprising:
 a main body having a main outer housing containing a plurality of internal components configured to facilitate autonomous cleaning within an indoor region;
 a mobility module coupled to the main body and configured to move the robot autonomously across a floor within the indoor region;
 a robotic arm having a fixed end coupled to the main body or the mobility module and a movable end configured to move through multiple degrees of freedom relative to the fixed end, wherein the robotic arm is configured to facilitate autonomous cleaning within the indoor region;
 one or more cleaning tools configured to be manipulated by the robotic arm to perform a cleaning function within the indoor region; and
 a door opening module configured to pull open a closed spring-loaded door autonomously and hold open the spring-loaded door autonomously while the mobility module moves the robotic cleaning device autonomously through the open spring-loaded door, wherein the door opening module includes the robotic arm and an extendable foot arrangement, the robot arm being configured to actuate a door lever or doorknob of the spring-loaded door and pull open the spring-loaded door and the extendable foot arrangement being configured to automatically extend from the robot, pivot behind the spring-loaded door while the spring-loaded door is open, contact a surface of the spring-loaded door on the other side of the robot, and hold open the spring-loaded door while the mobility module moves the robot through the open spring-loaded door from a region outside of the indoor region to be cleaned into the indoor region.

18. The robot of claim 17, wherein the one or more cleaning tools includes multiple different cleaning tools removably mounted to respective mounting locations along one or more outer surfaces of the main body, the mobility module, or both, each of the multiple different cleaning tools being configured to be removed from its respective mounting location and to be manipulated by the robotic arm to perform a cleaning function within the indoor region, and further comprising:
 a tool change module configured to facilitate securely coupling and uncoupling the robotic arm to each of the multiple different cleaning tools, the tool change module including a robotic arm coupler on the movable end of the robotic arm and a separate tool coupler on each of the multiple different cleaning tools, each separate tool coupler being configured to removably couple with the robotic arm coupler.

19. A method of cleaning an indoor region using an autonomously functioning cleaning robot, the method comprising:
 performing automatically by the cleaning robot a first cleaning function within an indoor region using a first cleaning tool, wherein the first cleaning tool is removably coupled to a robotic arm of the cleaning robot;
 placing automatically by the robotic arm the first cleaning tool onto a first docking location located on the cleaning robot;
 uncoupling automatically the first cleaning tool from the robotic arm while the first cleaning tool is placed onto the first docking station;
 coupling automatically the robotic arm to a second cleaning tool while the second cleaning tool is located at a second docking location located on the cleaning robot, wherein the second cleaning tool is configured to facilitate the performance of a second cleaning function that is different than the first cleaning function;
 removing automatically by the robotic arm the second cleaning tool from the second docking location while the second cleaning tool is coupled to the robotic arm;
 performing automatically by the cleaning robot the second cleaning function using the second cleaning tool, wherein the automatic coupling and automatic uncoupling both utilize a tool change module configured to facilitate separately coupling and uncoupling the robotic arm to both of the first and second cleaning tools;
 moving automatically the cleaning robot across a floor of a region outside of the indoor region using a mobility module of the cleaning robot;
 opening automatically a closed spring-loaded door using a door opening module of the cleaning robot, wherein the door opening module includes an extendable foot arrangement configured to automatically extend from the cleaning robot, pivot behind the spring-loaded door while the spring-loaded door is open, and contact a surface of the spring-loaded door on the other side the cleaning robot;
 holding open automatically the spring-loaded hinged door using the extended foot arrangement as the extended foot arrangement contacts the door surface; and
 moving automatically the cleaning robot through the open door using the mobility module while the door opening module holds open the door.

20. The method of claim 19, wherein the tool change module includes a robotic arm coupler on the robotic arm and a separate tool coupler on each of the first and second cleaning tools configured to removably couple with the robotic arm coupler.

* * * * *